US010023491B2

(12) United States Patent
Zhao et al.

(10) Patent No.: US 10,023,491 B2
(45) Date of Patent: Jul. 17, 2018

(54) INORGANIC FIBER

(71) Applicant: UNIFRAX I LLC, Tonawanda, NY (US)

(72) Inventors: Donghui Zhao, Amherst, NY (US); Bruce K. Zoitos, Williamsville, NY (US); Jason M. Hamilton, Lancaster, NY (US); Michael J. Andrejcak, Tonawanda, NY (US); Karen L. Hanson, Youngstown, NY (US)

(73) Assignee: Unifrax I LLC, Tonawanda, NY (US)

( * ) Notice: Subject to any disclaimer, the term of this patent is extended or adjusted under 35 U.S.C. 154(b) by 0 days.

(21) Appl. No.: 15/410,182

(22) Filed: Jan. 19, 2017

(65) Prior Publication Data

US 2017/0203999 A1     Jul. 20, 2017

Related U.S. Application Data

(60) Provisional application No. 62/280,282, filed on Jan. 19, 2016.

(51) Int. Cl.
| | | |
|---|---|---|
| C03C 13/00 | (2006.01) | |
| C03C 3/087 | (2006.01) | |
| C03C 4/00 | (2006.01) | |
| F16L 59/02 | (2006.01) | |

(52) U.S. Cl.
CPC .............. *C03C 13/00* (2013.01); *C03C 3/087* (2013.01); *C03C 4/0014* (2013.01); *F16L 59/028* (2013.01); *C03C 2204/00* (2013.01); *C03C 2213/02* (2013.01)

(58) Field of Classification Search
CPC ........ C03C 13/00; C03C 13/06; C03C 13/006
See application file for complete search history.

(56) References Cited

U.S. PATENT DOCUMENTS

| | | |
|---|---|---|
| 1,759,919 A | 5/1930 | Singer |
| 2,051,279 A | 8/1936 | Thorndyke |
| 2,335,220 A | 11/1943 | Edwards |
| 2,576,312 A | 11/1951 | Minnick |
| 2,690,393 A | 9/1954 | McGarvey |
| 2,693,668 A | 11/1954 | Slayter |
| 2,699,415 A | 1/1955 | Nachtman |
| 2,710,261 A | 6/1955 | McMullen |
| 2,876,120 A | 3/1959 | Machlan |
| 2,877,124 A | 3/1959 | Welsh |
| 3,112,184 A | 11/1963 | Hollenbach |
| 3,166,428 A | 1/1965 | Thomas |
| 3,348,994 A | 10/1967 | Rees et al. |
| 3,380,818 A | 4/1968 | Smith |
| 3,383,275 A | 5/1968 | Croop et al. |
| 3,402,055 A | 9/1968 | Harris et al. |
| 3,455,731 A | 7/1969 | Nielsen et al. |
| 3,458,329 A | 7/1969 | Owens et al. |
| 3,459,568 A | 8/1969 | Rinehart |
| 3,469,729 A | 9/1969 | Grekila et al. |
| 3,597,179 A | 8/1971 | Simmons |
| 3,687,850 A | 8/1972 | Gagin |
| 3,783,092 A | 1/1974 | Majumdar |
| 3,785,836 A | 1/1974 | Bacon |
| 3,788,885 A | 1/1974 | Birchall et al. |
| 3,789,096 A | 1/1974 | Church et al. |
| 3,799,836 A | 3/1974 | Rogers et al. |
| 3,804,608 A | 4/1974 | Gaskell et al. |
| 3,804,646 A | 4/1974 | Dumbaugh, Jr. |
| 3,811,901 A | 5/1974 | Bacon |
| 3,854,986 A | 12/1974 | Chvalovsky et al. |
| 3,887,386 A | 6/1975 | Majumdar |
| 3,899,342 A | 8/1975 | Birchall et al. |
| 3,900,329 A | 8/1975 | Grubb et al. |
| 3,904,424 A | 9/1975 | Aoki et al. |
| 3,985,935 A | 10/1976 | Brodmann |
| 3,992,498 A | 11/1976 | Morton et al. |
| 4,002,482 A | 1/1977 | Coenen |
| 4,011,651 A | 3/1977 | Bradbury et al. |
| 4,036,654 A | 7/1977 | Yale et al. |
| 4,037,015 A | 7/1977 | Koike et al. |
| 4,078,939 A | 3/1978 | Schwochow |
| 4,102,692 A | 7/1978 | Schartau et al. |
| 4,104,355 A | 8/1978 | Dunn et al. |
| 4,118,239 A | 10/1978 | Gagin et al. |
| 4,194,914 A | 3/1980 | Moriya et al. |
| 4,243,421 A | 1/1981 | Kume |
| 4,303,722 A | 12/1981 | Pilgrim |
| 4,317,575 A | 3/1982 | Cavicchio et al. |
| 4,330,628 A | 5/1982 | Cockram et al. |
| 4,345,430 A | 8/1982 | Pallo et al. |
| 4,358,500 A | 11/1982 | George et al. |
| 4,363,878 A | 12/1982 | Yamamoto et al. |
| 4,366,251 A | 12/1982 | Rapp |
| 4,375,493 A | 3/1983 | George et al. |
| 4,379,111 A | 4/1983 | Smith et al. |
| 4,382,104 A | 5/1983 | Smith et al. |
| 4,387,180 A | 6/1983 | Jen et al. |

(Continued)

FOREIGN PATENT DOCUMENTS

| | | |
|---|---|---|
| CA | 1 271 785 A | 7/1990 |
| CA | 2017344 | 11/1990 |

(Continued)

OTHER PUBLICATIONS

Wallenburger, et al. "Inviscid melt spinning: As-spun crystalline alumina fibers", J. Mater. Res., vol. 5, No. 11, Nov. 1990.

(Continued)

*Primary Examiner* — Elizabeth A. Bolden
(74) *Attorney, Agent, or Firm* — Curatolo Sidoti Co., LPA; Salvatore A. Sidoti; Floyd Trillis, III (57) ABSTRACT

An inorganic fiber containing silica and magnesia as the major fiber components which further includes intended synergistic amounts of calcia and, an additional alkali metal oxide other than magnesia, such as lithium oxide, to improve the thermal performance and manufacturability of the fiber. The inorganic fiber is easier to manufacture, has a better fiber quality, exhibits good thermal performance at a use temperature of 1260° C. and greater, retains mechanical integrity after exposure to the use temperature, and exhibits low biopersistence in physiological fluids. Also provided are methods of preparing the inorganic fiber and of thermally insulating articles using thermal insulation prepared from the inorganic fibers.

26 Claims, 1 Drawing Sheet

(56) References Cited

U.S. PATENT DOCUMENTS

| | | |
|---|---|---|
| 4,396,661 A | 8/1983 | George et al. |
| 4,412,911 A | 11/1983 | Schucker et al. |
| 4,428,999 A | 1/1984 | George et al. |
| 4,461,840 A | 7/1984 | Massol |
| 4,492,722 A | 1/1985 | Ritter, II et al. |
| 4,507,355 A | 3/1985 | George et al. |
| 4,542,106 A | 9/1985 | Sproull |
| 4,547,403 A | 10/1985 | Smith |
| 4,558,015 A | 12/1985 | Ekdahl et al. |
| 4,563,219 A | 1/1986 | George et al. |
| 4,604,097 A | 8/1986 | Graves et al. |
| 4,613,577 A | 9/1986 | Tagai et al. |
| 4,615,988 A | 10/1986 | Le Moigne et al. |
| 4,659,610 A | 4/1987 | George et al. |
| 4,673,594 A | 6/1987 | Smith |
| 4,687,749 A | 8/1987 | Beall |
| 4,735,857 A | 4/1988 | Tagai et al. |
| 4,737,192 A | 4/1988 | Smith |
| 4,778,499 A | 10/1988 | Beaver |
| 4,820,573 A | 4/1989 | Tagai et al. |
| 4,830,989 A | 5/1989 | Trivedi et al. |
| 4,867,779 A | 9/1989 | Meunier et al. |
| 4,882,302 A | 11/1989 | Horiuchi et al. |
| 4,933,307 A | 6/1990 | Marshall et al. |
| 5,037,470 A | 8/1991 | Matzen et al. |
| 5,055,428 A | 10/1991 | Porter |
| 5,064,785 A | 11/1991 | Kawamoto et al. |
| 5,108,957 A | 4/1992 | Cohen et al. |
| 5,145,734 A | 9/1992 | Ito et al. |
| 5,221,558 A | 6/1993 | Sonuparlak et al. |
| 5,223,336 A | 6/1993 | Griffith et al. |
| 5,250,488 A | 10/1993 | Thelohan et al. |
| 5,284,807 A | 2/1994 | Komori et al. |
| 5,312,806 A | 5/1994 | Mogensen |
| 5,332,699 A | 7/1994 | Olds et al. |
| 5,346,575 A | 9/1994 | Griffith et al. |
| 5,346,868 A | 9/1994 | Eschner |
| 5,371,050 A | 12/1994 | Belitskus et al. |
| 5,384,188 A | 1/1995 | Lebold et al. |
| 5,389,716 A | 2/1995 | Graves |
| 5,401,693 A | 3/1995 | Bauer et al. |
| 5,420,087 A | 5/1995 | Wieland et al. |
| 5,480,676 A | 1/1996 | Sonuparlak et al. |
| 5,486,232 A | 1/1996 | Griffith et al. |
| 5,552,213 A | 9/1996 | Eschner |
| 5,569,629 A | 10/1996 | Teneyck et al. |
| 5,576,252 A | 11/1996 | Rapp et al. |
| 5,580,532 A | 12/1996 | Robinson et al. |
| 5,583,080 A | 12/1996 | Guldberg et al. |
| 5,585,312 A | 12/1996 | TenEyck et al. |
| 5,591,516 A | 1/1997 | Jaco et al. |
| 5,603,887 A | 2/1997 | Eschner |
| RE35,557 E | 7/1997 | Thelohan et al. |
| 5,714,421 A | 2/1998 | Olds et al. |
| 5,811,360 A | 9/1998 | Jubb |
| 5,821,183 A | 10/1998 | Jubb |
| 5,843,854 A | 12/1998 | Karppinen et al. |
| 5,858,465 A | 1/1999 | Hunt et al. |
| 5,874,375 A | 2/1999 | Zoitos et al. |
| 5,928,075 A | 7/1999 | Miya et al. |
| 5,932,500 A | 8/1999 | Jensen et al. |
| 5,935,886 A | 8/1999 | Jensen et al. |
| 5,955,389 A | 9/1999 | Jubb |
| 5,962,354 A | 10/1999 | Fyles et al. |
| 5,968,648 A | 10/1999 | Rapp et al. |
| 5,994,247 A | 11/1999 | Jubb et al. |
| 5,998,315 A | 12/1999 | Jubb |
| 6,013,592 A | 1/2000 | Merrill et al. |
| 6,025,288 A | 2/2000 | Zoitos et al. |
| 6,030,910 A | 2/2000 | Zoitos et al. |
| 6,036,762 A | 3/2000 | Sambasivan |
| 6,037,284 A | 3/2000 | Holstein et al. |
| 6,037,288 A | 3/2000 | Robinson et al. |
| 6,043,170 A | 3/2000 | Steinkopf et al. |
| 6,077,798 A | 6/2000 | Rapp |
| 6,156,683 A | 12/2000 | Grove-Rasmussen et al. |
| 6,180,546 B1 | 1/2001 | Jubb et al. |
| 6,284,684 B1 | 9/2001 | Vignesoult et al. |
| 6,309,994 B1 | 10/2001 | Marra et al. |
| 6,313,050 B1 | 11/2001 | De Meringo et al. |
| 6,346,494 B1 | 2/2002 | Jensen et al. |
| 6,358,872 B1 | 3/2002 | Karppinen et al. |
| 6,458,436 B1 | 10/2002 | Hansen et al. |
| 6,461,415 B1 | 10/2002 | Sambasivan et al. |
| 6,517,906 B1 | 2/2003 | Economy et al. |
| 6,551,951 B1 | 4/2003 | Fay et al. |
| 6,652,950 B2 | 11/2003 | Barney et al. |
| 6,716,407 B2 | 4/2004 | Davis et al. |
| 6,855,298 B2 | 2/2005 | Teneyck |
| 6,861,381 B1 | 3/2005 | Jubb et al. |
| 6,897,173 B2 | 5/2005 | Bernard et al. |
| 6,953,757 B2 | 10/2005 | Zoitos et al. |
| 7,153,796 B2 | 12/2006 | Jubb et al. |
| 7,160,824 B2 | 1/2007 | Zguris et al. |
| 7,259,118 B2 | 8/2007 | Jubb et al. |
| 7,468,336 B2 | 12/2008 | Zoitos et al. |
| 7,468,337 B2 | 12/2008 | Zoitos et al. |
| 7,470,641 B2 | 12/2008 | Jubb et al. |
| 7,550,118 B2 | 6/2009 | Merry et al. |
| 7,567,817 B2 | 7/2009 | Liu et al. |
| 7,638,447 B2 | 12/2009 | Bernard et al. |
| 7,651,965 B2 | 1/2010 | Jubb et al. |
| 7,704,902 B2 | 4/2010 | Maquin et al. |
| 7,709,027 B2 | 5/2010 | Fechner et al. |
| 7,781,043 B2 | 8/2010 | Nakayama et al. |
| 7,781,372 B2 | 8/2010 | Liu et al. |
| 7,803,729 B2 | 9/2010 | Keller et al. |
| 7,875,566 B2 | 1/2011 | Freeman et al. |
| 7,887,917 B2 | 2/2011 | Zoitos et al. |
| 7,897,255 B2 | 3/2011 | Liu et al. |
| 8,026,190 B2 | 9/2011 | Keller et al. |
| 8,147,952 B2 | 4/2012 | Iwamoto et al. |
| 8,163,377 B2 | 4/2012 | Wainwright et al. |
| 8,252,707 B2 | 8/2012 | McGinnis et al. |
| 8,343,400 B2 | 1/2013 | Cordts et al. |
| 8,551,897 B2 | 10/2013 | Zoitos et al. |
| 8,562,879 B2 | 10/2013 | Frost et al. |
| 8,834,758 B2 | 9/2014 | Endle et al. |
| 8,877,102 B2 | 11/2014 | Bernard et al. |
| 9,321,243 B2 | 4/2016 | Fernando et al. |
| 9,556,062 B2 | 1/2017 | Zhao et al. |
| 9,567,256 B2 | 2/2017 | Zoitos et al. |
| 2002/0022567 A1 | 2/2002 | Li et al. |
| 2002/0032116 A1 | 3/2002 | Jubb et al. |
| 2002/0107133 A1 | 8/2002 | Troczynski et al. |
| 2003/0015003 A1 | 1/2003 | Fisler et al. |
| 2003/0049329 A1 | 3/2003 | Lee et al. |
| 2003/0138673 A1 | 7/2003 | Sambasivan et al. |
| 2003/0162019 A1 | 8/2003 | Zoitos et al. |
| 2004/0011245 A1 | 1/2004 | Sambasivan et al. |
| 2005/0013873 A1 | 1/2005 | Fechner et al. |
| 2005/0032620 A1 | 2/2005 | Zoitos et al. |
| 2005/0079970 A1 | 4/2005 | Otaki et al. |
| 2005/0085369 A1 | 4/2005 | Jensen |
| 2005/0268656 A1 | 12/2005 | Raichel et al. |
| 2006/0094583 A1 | 5/2006 | Freeman et al. |
| 2006/0211562 A1 | 9/2006 | Fisler et al. |
| 2007/0020454 A1 | 1/2007 | Zoitos et al. |
| 2008/0146430 A1 | 6/2008 | Li et al. |
| 2008/0191179 A1 | 8/2008 | Bernard et al. |
| 2009/0042030 A1 | 2/2009 | Douce et al. |
| 2009/0053510 A1 | 2/2009 | Jubb |
| 2009/0130937 A1 | 5/2009 | Wainwright et al. |
| 2010/0055457 A1 | 3/2010 | Jubb |
| 2010/0093510 A1 | 4/2010 | Tanaka et al. |
| 2010/0184581 A1 | 7/2010 | Berthereau et al. |
| 2010/0209306 A1 | 8/2010 | Kunze et al. |
| 2010/0298110 A1 | 11/2010 | Richter et al. |
| 2011/0118102 A1 | 5/2011 | Zoitos et al. |
| 2011/0172077 A1 | 7/2011 | Lewis |
| 2012/0160104 A1 | 6/2012 | Vulfson |
| 2013/0225025 A1 | 8/2013 | McGinnis et al. |

(56) References Cited

U.S. PATENT DOCUMENTS

| | | |
|---|---|---|
| 2013/0333594 A1 | 12/2013 | Berthereau et al. |
| 2015/0175477 A1 | 6/2015 | Zhao et al. |
| 2018/0017519 A1 | 1/2018 | Zhao et al. |

FOREIGN PATENT DOCUMENTS

| | | |
|---|---|---|
| CA | 2043699 | 12/1991 |
| EP | 0 074 655 A1 | 3/1983 |
| EP | 0132078 | 1/1985 |
| EP | 0 142 715 A2 | 5/1985 |
| EP | 0 146 398 A2 | 6/1985 |
| EP | 0 155 550 A1 | 9/1985 |
| EP | 0 178 688 A2 | 4/1986 |
| EP | 0 178 689 A2 | 4/1986 |
| EP | 0 186 128 A2 | 7/1986 |
| EP | 0 302 465 A2 | 2/1989 |
| EP | 0 417 493 A2 | 3/1991 |
| EP | 0 427 873 A1 | 5/1991 |
| EP | 0 539 342 A1 | 4/1993 |
| EP | 0 834 489 A1 | 4/1998 |
| EP | 1 086 936 A2 | 3/2001 |
| EP | 1 323 687 A2 | 7/2003 |
| EP | 1 908 737 A1 | 4/2008 |
| FR | 2662687 | 12/1991 |
| GB | 520247 | 4/1940 |
| GB | 1 360 197 | 7/1974 |
| GB | 1 360 198 | 7/1974 |
| GB | 1 360 199 | 7/1974 |
| GB | 1 360 200 | 7/1974 |
| GB | 2 200 129 A | 7/1988 |
| GB | 2 383 793 | 7/2003 |
| JP | 2002/338300 | 11/2002 |
| JP | 06-272116 A | 10/2006 |
| JP | 07-033546 A | 2/2007 |
| JP | 07-303011 A | 11/2007 |
| JP | 4007482 B2 | 11/2007 |
| JP | 40-19111 B2 | 12/2007 |
| KR | 10-2004-0013846 A | 2/2004 |
| KR | 10-2010-0084917 A | 7/2010 |
| WO | WO 85/02393 A1 | 6/1985 |
| WO | WO 85/02394 A1 | 6/1985 |
| WO | WO 87/05007 A1 | 8/1987 |
| WO | WO 89/12032 A2 | 12/1989 |
| WO | WO 90/02713 A1 | 3/1990 |
| WO | WO 92/07801 A1 | 5/1992 |
| WO | WO 92/09536 A1 | 6/1992 |
| WO | WO 93/15028 A1 | 8/1993 |
| WO | WO 94/15883 A1 | 7/1994 |
| WO | WO 95/032925 | 12/1995 |
| WO | WO 95/32926 A1 | 12/1995 |
| WO | WO 96/05147 A1 | 2/1996 |
| WO | WO 98/32606 A1 | 7/1998 |
| WO | WO 98/51981 A1 | 11/1998 |
| WO | WO 02/16263 A1 | 2/2002 |
| WO | WO 03/031368 A2 | 4/2003 |
| WO | WO 03/050054 A1 | 6/2003 |
| WO | WO 03/059835 A1 | 7/2003 |
| WO | WO 2006/048610 A1 | 5/2006 |
| WO | WO 2007/005836 A2 | 1/2007 |
| WO | WO 2007/086677 A1 | 8/2007 |

OTHER PUBLICATIONS

Shyu, Jiin-Jyh and Wu, Jenn-Ming, Effect of $TiO_2$ addition on the nucleation of apatite in an MgO—CaO—SiO—$P_2O_5$ glass, Journal of Materials Science Letters, vol. 10, 1991.

INORGANIC FIBER

CROSS REFERENCE TO RELATED APPLICATION

This application claims the benefit of the filing date under 35 U.S.C. § 119(e) of U.S. Provisional Application Patent Ser. No. 62/025,142 filed on Jul. 16, 2014, which is incorporated herein by reference.

TECHNICAL FIELD

A high temperature resistant inorganic fiber that is useful as thermal, electrical, or acoustical insulating material, and which has a continuous use temperature of 1260° C. and greater is provided. The high temperature resistant inorganic fiber is easily manufacturable, exhibits low shrinkage after exposure to use temperatures, retains good mechanical strength after continued exposure to use temperatures, and exhibits low biopersistence in physiological fluids.

BACKGROUND

Refractory ceramic fibers, such as those based on alumino-silicate chemistry, have been sold extensively for thermal and electrical insulation applications since their development in the 1950s. Rodent inhalation studies conducted in the 1980s demonstrated a level of carcinogenic potential associated with biopersistent refractory ceramic fibers. These studies have motivated the industry to develop physiological lung fluid-soluble and non-biopersistent inorganic fibers as an alternative to refractory ceramic fibers.

While candidate fibers have been proposed, the use temperature limit of these fibers have not been high enough to accommodate many of the applications to which high temperature resistant refractory ceramic fibers are used. For example, such low biopersistent fibers often exhibit high linear shrinkage at the continuous use temperatures and/or reduced mechanical properties when exposed to continuous use temperatures of 1260° C. and greater as compared to the performance of typical refractory ceramic fibers.

The high temperature resistant, low biopersistence fibers should exhibit minimal linear shrinkage at expected exposure temperatures, and after prolonged or continuous exposure to the expected use temperatures, in order to provide effective thermal protection to the article being insulated.

In addition to temperature resistance as expressed by shrinkage characteristics that are important in fibers that are used in insulation, it is also required that the low biopersistence fibers have mechanical property characteristics during and following exposure to the expected use or service temperature, that will permit the fiber to maintain its structural integrity and insulating characteristics in use.

One characteristic of the mechanical integrity of a fiber is its after service friability. The more friable a fiber, that is, the more easily it is crushed or crumbled to a powder, the less mechanical integrity it possesses. In general, inorganic fibers that exhibit both high temperature resistance and low biopersistence in physiological fluids also exhibit a high degree of after service friability. This results in a brittle fiber lacking the strength or mechanical integrity after exposure to the service temperature to be able to provide the necessary structure to accomplish its insulating purpose. Other measures of mechanical integrity of fibers include compression strength and compression recovery.

It is desirable to produce an improved inorganic fiber composition having an improved viscosity so as to be readily manufacturable from a fiberizable melt of desired ingredients, which exhibits low biopersistence in physiological fluids, low shrinkage during and after exposure to service temperatures of 1260° C. and greater and, which exhibits low brittleness after exposure to the expected use temperatures, and which maintains mechanical integrity after exposure to use temperatures of 1260° C. and greater.

SUMMARY

Provided is a high temperature resistant low-biopersistent inorganic fiber exhibiting improved thermal stability when the inorganic fiber is exposed to elevated temperatures of 1260° C., 1400° C. or greater. It has been found that the intentional inclusion of synergistic amounts of at least one alkali metal oxide and at least one alkaline earth metal oxide different from magnesium oxide in a magnesium-silicate inorganic fiber reduces linear shrinkage of the fiber and enhances mechanical strength of the fiber beyond that of alkaline earth silicate fibers without the inclusion of the synergistic combination of the alkali metal oxide and alkaline earth metal oxide. The at least one alkaline earth metal oxide different from magnesium oxide in a magnesium-silicate inorganic is referred to in this disclosure as an "additional alkaline earth metal oxide". The intentional synergistic amounts also result in an improved viscosity of the raw material melt so as to provide easier manufacturability and better fiber quality.

According to certain illustrative embodiments, the high temperature resistant low-biopersistent inorganic fiber comprises a magnesium-silicate fiber having an intentional inclusion of synergistic amounts of one alkali metal oxide and one additional alkaline earth metal oxide. According to other illustrative embodiments, the high temperature resistant low-biopersistent inorganic fiber comprises a magnesium-silicate fiber having an intentional inclusion of synergistic amounts of lithium oxide and calcia.

The inorganic fiber exhibits low biopersistence in physiological solutions, reduced linear shrinkage, improved mechanical strength and compression recovery after exposure to expected use temperatures.

DETAILED DESCRIPTION

Figure 1:
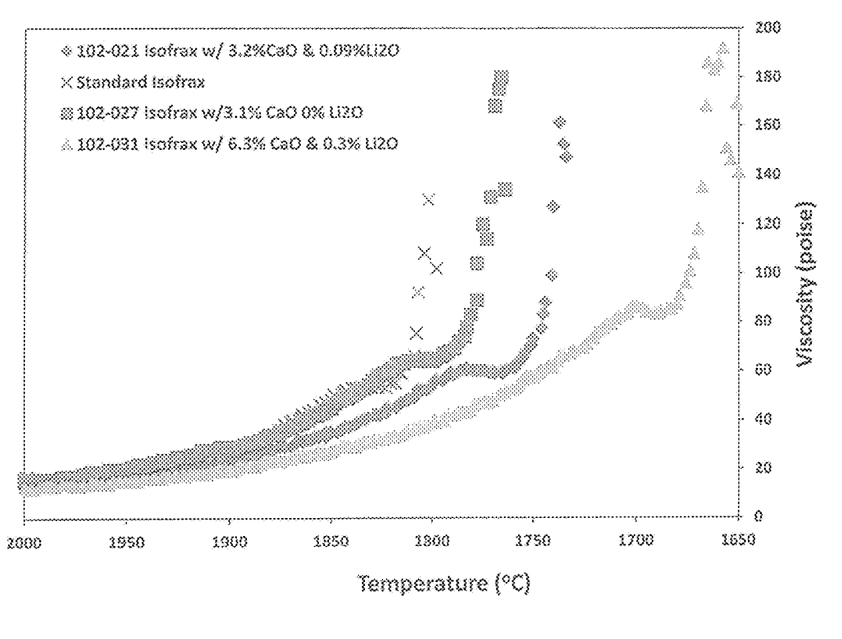
FIG. 1 is a temperature-viscosity curve comparing the viscosity of fiber melts used to prepare low biopersistent magnesium-silicate fibers commercially available under the registered trademark ISOFRAX, and certain illustrative embodiments of the presently disclosed inorganic fiber.

According to certain embodiments, the inorganic fiber comprises the fiberization product of silica, magnesia, calcia and lithium oxide.

According to certain embodiments, the inorganic fiber comprises the fiberization product of silica, magnesia, calcia, lithium oxide, and a further viscosity modifier.

According to certain embodiments, the inorganic fiber comprises the fiberization product of silica, magnesia, lithium oxide, calcia and alumina.

According to certain embodiments, the inorganic fiber comprises the fiberization product of silica, magnesia, lithium oxide, calcia and boria.

According to certain embodiments, the inorganic fiber comprises the fiberization product of silica, magnesia, lithium oxide, calcia and a mixture of alumina and boria.

According to certain embodiments, the inorganic fiber comprises the fiberization product of silica, magnesia, zirconia, lithium oxide, calcia and a further viscosity modifier.

According to certain embodiments, the inorganic fiber comprises the fiberization product of silica, magnesia, zirconia, lithium oxide, calcia and alumina.

According to certain embodiments, the inorganic fiber comprises the fiberization product of silica, magnesia, zirconia, lithium oxide, calcia and boria.

According to certain embodiments, the inorganic fiber comprises the fiberization product of silica, magnesia, zirconia, lithium oxide, calcia and a mixture of alumina and boria.

It should be understood that when a range of values is described in the present disclosure, it is intended that any and every value within the range, including the end points, is to be considered as having been disclosed. For example, "a range of from 65 to 86 silica" is to be read as indicating each and every possible number along the continuum between 65 and 86. It is to be understood that the inventors appreciate and understand that any and all values within the range are to be considered to have been specified, and that the inventors have possession of the entire range and all the values within the range.

In the present disclosure, the term "about" used in connection with a value is inclusive of the stated value and has the meaning dictated by the context. For example, it includes at least the degree of error associated with the measurement of the particular value. One of ordinary skill in the art would understand the term "about" is used herein to mean that an amount of "about" of a recited value produces the desired degree of effectiveness in the compositions and/or methods of the present disclosure. One of ordinary skill in the art would further understand that the metes and bounds of "about" with respect to the value of a percentage, amount or quantity of any component in an embodiment can be determined by varying the value, determining the effectiveness of the compositions for each value, and determining the range of values that produce compositions with the desired degree of effectiveness in accordance with the present disclosure. The term "about" is further used to reflect the possibility that a composition may contain trace components of other materials that do not alter the effectiveness or safety of the composition.

In the present disclosure, the term "substantially" refers to a degree of deviation that is sufficiently small so as to not measurably detract from the identified property or circumstance. The exact degree of deviation allowable may in some cases depend on the specific context. The phrase "substantially free" means that the composition excludes any amount more than trace impurities that are not intentionally added to the fiber melt, but which may be present in the raw starting materials from which the fibers are produced.

The compositional weight percentages disclosed herein are based on the total weight of the fiber. It will be understood to one of ordinary skill in the art that the total weight percent of the fiber cannot exceed 100%. For example, a person of ordinary skill in the art would easily recognize and understand that a fiber composition comprising 65 to 86 weight percent silica, 14 to 35 weight percent magnesia, 0.1 to 5 weight percent calcia, and 0.1 to 2 weight percent lithium oxide will not exceed 100%. A person of ordinary skill in the art would understand that the amount of silica and magnesia will be adjusted to include the desired amount of silica, magnesia, calcia and lithium oxide without exceeding 100% by weight of the fiber.

According to certain illustrative embodiments, the inorganic fiber comprises the fiberization product of about 65 to about 86 weight percent silica, greater than 0 to about 35 weight percent magnesia, calcia, and lithium oxide.

According to certain illustrative embodiments, the inorganic fiber comprises the fiberization product of about 65 to about 86 weight percent silica, greater than 0 to about 35 weight percent magnesia, greater than 0 to about 35 weight percent calcia, and lithium oxide.

According to certain illustrative embodiments, the inorganic fiber comprises the fiberization product of about 65 to about 86 weight percent silica, greater than 0 to about 35 weight percent magnesia, greater than 0 to about 35 weight percent calcia, and greater than 0 to about 5 weight percent lithium oxide.

According to certain illustrative embodiments, the inorganic fiber comprises the fiberization product of about 65 to about 86 weight percent silica, greater than 5 to about 35 weight percent magnesia, greater than 1 to about 15 weight percent calcia, and about 0.1 to about 5 weight percent lithium oxide.

According to certain illustrative embodiments, the inorganic fiber comprises the fiberization product of about 65 to about 86 weight percent silica, greater than 0 to about 35 weight percent magnesia, about 0.1 to about 15 weight percent calcia, and about 0.1 to about 5 weight percent lithium oxide.

According to certain illustrative embodiments, the inorganic fiber comprises the fiberization product of about 65 to about 86 weight percent silica, greater than 0 to about 35 weight percent magnesia, about 0.1 to about 10 weight percent calcia, and about 0.1 to about 2 weight percent lithium oxide.

According to certain illustrative embodiments, the inorganic fiber comprises the fiberization product of about 65 to about 86 weight percent silica, greater than 0 to about 35 weight percent magnesia, about 0.1 to about 5 weight percent calcia, and about 0.1 to about 1 weight percent lithium oxide.

According to certain illustrative embodiments, the inorganic fiber comprises the fiberization product of about 65 to about 86 weight percent silica, greater than 0 to about 35 weight percent magnesia, about 0.1 to about 3 weight percent calcia, and about 0.1 to about 1 weight percent lithium oxide.

According to certain illustrative embodiments, the inorganic fiber comprises the fiberization product of about 65 to about 86 weight percent silica, about 5 to about 35 weight percent magnesia, about 0.1 to about 15 weight percent calcia, and about 0.1 to about 5 weight percent lithium oxide.

According to certain illustrative embodiments, the inorganic fiber comprises the fiberization product of about 65 to about 86 weight percent silica, about 5 to about 35 weight percent magnesia, greater than 1 to about 15 weight percent calcia, and about 0.1 to about 5 weight percent lithium oxide.

According to certain illustrative embodiments, the inorganic fiber comprises the fiberization product of about 65 to about 86 weight percent silica, about 5 to about 35 weight percent magnesia, about 0.1 to about 10 weight percent calcia, and about 0.1 to about 2 weight percent lithium oxide.

According to certain illustrative embodiments, the inorganic fiber comprises the fiberization product of about 65 to about 86 weight percent silica, about 5 to about 35 weight percent magnesia, greater than 1 to about 10 weight percent calcia, and about 0.1 to about 2 weight percent lithium oxide.

According to certain illustrative embodiments, the inorganic fiber comprises the fiberization product of about 65 to about 86 weight percent silica, about 5 to about 35 weight percent magnesia, about 0.1 to about 5 weight percent calcia, and about 0.1 to about 1 weight percent lithium oxide.

According to certain illustrative embodiments, the inorganic fiber comprises the fiberization product of about 65 to about 86 weight percent silica, about 5 to about 35 weight percent magnesia, greater than 1 to about 5 weight percent calcia, and about 0.1 to about 1 weight percent lithium oxide.

According to certain illustrative embodiments, the inorganic fiber comprises the fiberization product of about 65 to about 86 weight percent silica, about 5 to about 35 weight percent magnesia, about 0.1 to about 3 weight percent calcia, and about 0.1 to about 1 weight percent lithium oxide.

According to certain illustrative embodiments, the inorganic fiber comprises the fiberization product of about 65 to about 86 weight percent silica, about 10 to about 25 weight percent magnesia, about 0.1 to about 15 weight percent calcia, and about 0.1 to about 5 weight percent lithium oxide.

According to certain illustrative embodiments, the inorganic fiber comprises the fiberization product of about 65 to about 86 weight percent silica, about 10 to about 25 weight percent magnesia, greater than 1 to about 15 weight percent calcia, and about 0.1 to about 5 weight percent lithium oxide.

According to certain illustrative embodiments, the inorganic fiber comprises the fiberization product of about 65 to about 86 weight percent silica, about 10 to about 25 weight percent magnesia, about 0.1 to about 10 weight percent calcia, and about 0.1 to about 2 weight percent lithium oxide.

According to certain illustrative embodiments, the inorganic fiber comprises the fiberization product of about 65 to about 86 weight percent silica, about 10 to about 25 weight percent magnesia, greater than 1 to about 10 weight percent calcia, and about 0.1 to about 2 weight percent lithium oxide.

According to certain illustrative embodiments, the inorganic fiber comprises the fiberization product of about 65 to about 86 weight percent silica, about 10 to about 25 weight percent magnesia, about 0.1 to about 5 weight percent calcia, and about 0.1 to about 1 weight percent lithium oxide.

According to certain illustrative embodiments, the inorganic fiber comprises the fiberization product of about 65 to about 86 weight percent silica, about 10 to about 25 weight percent magnesia, greater than 1 to about 5 weight percent calcia, and about 0.1 to about 1 weight percent lithium oxide.

According to certain illustrative embodiments, the inorganic fiber comprises the fiberization product of about 65 to about 86 weight percent silica, about 10 to about 25 weight percent magnesia, about 0.1 to about 3 weight percent calcia, and about 0.1 to about 1 weight percent lithium oxide.

According to certain illustrative embodiments, the inorganic fiber comprises the fiberization product of about 65 to about 86 weight percent silica, about 10 to about 25 weight percent magnesia, greater than 1 to about 3 weight percent calcia, and about 0.1 to about 1 weight percent lithium oxide.

According to certain illustrative embodiments, the inorganic fiber comprises the fiberization product of about 65 to about 86 weight percent silica, greater than 0 to about 35 weight percent magnesia, greater than 0 to about 35 weight percent calcia, lithium oxide and boria.

According to certain illustrative embodiments, the inorganic fiber comprises the fiberization product of about 65 to about 86 weight percent silica, about 10 to about 25 weight percent magnesia, greater than 1 to about 10 weight percent calcia, about 0.1 to about 2 weight percent lithium oxide and about 0.1 to about 5 weight percent boria.

According to certain illustrative embodiments, the inorganic fiber comprises the fiberization product of about 65 to about 86 weight percent silica, about 10 to about 25 weight percent magnesia, greater than 1 to about 10 weight percent calcia, lithium oxide and a combination of alumina and boria.

According to certain illustrative embodiments, the inorganic fiber comprises the fiberization product of about 65 to about 86 weight percent silica, about 10 to about 25 weight percent magnesia, greater than 1 to about 10 weight percent calcia, about 0.1 to about 2 weight percent lithium oxide, about 0.1 to about 5 weight percent alumina, and about 0.1 to about 5 weight percent boria.

According to certain illustrative embodiments, the inorganic fiber comprises the fiberization product of about 65 to about 86 weight percent silica, about 5 to about 35 weight percent magnesia, greater than 1 to about 35 weight percent calcia, and greater than 0 to about 2 weight percent lithium oxide.

According to certain illustrative embodiments, the inorganic fiber comprises the fiberization product of about 65 to about 86 weight percent silica, about 5 to about 35 weight percent magnesia, greater than 1 to about 35 weight percent calcia, and about 0.1 to about 1.5 weight percent lithium oxide.

According to certain illustrative embodiments, the inorganic fiber comprises the fiberization product of about 65 to about 86 weight percent silica, about 5 to about 35 weight percent magnesia, greater than 1 to about 35 weight percent calcia, and about 0.1 to about 1 weight percent lithium oxide.

According to certain illustrative embodiments, the inorganic fiber comprises the fiberization product of about 65 to about 86 weight percent silica, about 5 to about 35 weight percent magnesia, greater than 1 to about 35 weight percent calcia, and about 0.1 to about 0.75 weight percent lithium oxide.

According to certain illustrative embodiments, the inorganic fiber comprises the fiberization product of about 65 to about 86 weight percent silica, about 5 to about 35 weight percent magnesia, greater than 1 to about 35 weight percent calcia, and about 0.1 to about 0.5 weight percent lithium oxide.

According to certain illustrative embodiments, the inorganic fiber comprises the fiberization product of about 65 to about 86 weight percent silica, about 5 to about 35 weight percent magnesia, greater than 1 to about 35 weight percent calcia, greater than 0 to about 2 weight percent lithium oxide and alumina.

According to certain illustrative embodiments, the inorganic fiber comprises the fiberization product of about 65 to about 86 weight percent silica, about 5 to about 35 weight percent magnesia, greater than 1 to about 35 weight percent calcia, and about 0.1 to about 2 weight percent lithium oxide and alumina.

According to certain illustrative embodiments, the inorganic fiber comprises the fiberization product of about 65 to about 86 weight percent silica, about 5 to about 35 weight percent magnesia, greater than 1 to about 35 weight percent calcia, greater than 0 to about 2 weight percent lithium oxide and boria.

According to certain illustrative embodiments, the inorganic fiber comprises the fiberization product of about 65 to about 86 weight percent silica, about 5 to about 35 weight percent magnesia, greater than 1 to about 35 weight percent calcia, and about 0.1 to about 2 weight percent lithium oxide and boria.

According to certain illustrative embodiments, the inorganic fiber comprises the fiberization product of about 65 to about 86 weight percent silica, greater than 0 to about 35 weight percent magnesia, greater than 0 to about 35 weight percent calcia, greater than 0 to about 2 weight percent lithium oxide and a combination of alumina and boria.

According to certain illustrative embodiments, the inorganic fiber comprises the fiberization product of about 65 to about 86 weight percent silica, about 5 to about 35 weight percent magnesia, greater than 1 to about 35 weight percent calcia, and about 0.1 to about 2 weight percent lithium oxide and a combination of alumina and boria.

According to certain illustrative embodiments, the inorganic fiber comprises the fiberization product of about 65 to about 86 weight percent silica, greater than 0 to about 35 weight percent magnesia, greater than 0 to about 35 weight percent calcia, greater than 0 to about 2 weight percent lithium oxide, and greater than 0 to about 5 weight percent alumina.

According to certain illustrative embodiments, the inorganic fiber comprises the fiberization product of about 65 to about 86 weight percent silica, greater than 0 to about 35 weight percent magnesia, greater than 0 to about 35 weight percent calcia, about 0.1 to about 2 weight percent lithium oxide, and greater than 0 to about 5 weight percent alumina.

According to certain illustrative embodiments, the inorganic fiber comprises the fiberization product of about 65 to about 86 weight percent silica, greater than 0 to about 35 weight percent magnesia, greater than 0 to about 35 weight percent calcia, about 0.5 to about 2 weight percent lithium oxide, and greater than 0 to about 5 weight percent alumina.

According to certain illustrative embodiments, the inorganic fiber comprises the fiberization product of about 65 to about 86 weight percent silica, greater than 0 to about 35 weight percent magnesia, greater than 0 to about 35 weight percent calcia, about 1 to about 2 weight percent lithium oxide, and greater than 0 to about 5 weight percent alumina.

According to certain illustrative embodiments, the inorganic fiber comprises the fiberization product of about 65 to about 86 weight percent silica, greater than 0 to about 35 weight percent magnesia, greater than 0 to about 35 weight percent calcia, about 1.5 to about 2 weight percent lithium oxide, and greater than 0 to about 5 weight percent alumina.

According to certain illustrative embodiments, the inorganic fiber comprises the fiberization product of about 65 to about 86 weight percent silica, about 10 to about 35 weight percent magnesia, greater than 0 to about 15 weight percent calcia, greater than 0 to about 2 weight percent lithium oxide, and greater than 0 to about 5 weight percent alumina.

According to certain illustrative embodiments, the inorganic fiber comprises the fiberization product of about 65 to about 86 weight percent silica, about 10 to about 35 weight percent magnesia, about 0.1 to about 10 weight percent calcia, and about 0.1 to about 2 weight percent lithium oxide.

According to certain illustrative embodiments, the inorganic fiber comprises the fiberization product of about 65 to about 86 weight percent silica, about 10 to about 35 weight percent magnesia, about 0.1 to about 10 weight percent calcia, and about 0.1 to about 1.5 weight percent lithium oxide.

According to certain illustrative embodiments, the inorganic fiber comprises the fiberization product of about 65 to about 86 weight percent silica, about 10 to about 35 weight percent magnesia, about 0.1 to about 10 weight percent calcia, and about 0.1 to about 1 weight percent lithium oxide.

According to certain illustrative embodiments, the inorganic fiber comprises the fiberization product of about 65 to about 86 weight percent silica, about 10 to about 35 weight percent magnesia, about 0.1 to about 10 weight percent calcia, and about 0.1 to about 0.75 weight percent lithium oxide.

According to certain illustrative embodiments, the inorganic fiber comprises the fiberization product of about 65 to about 86 weight percent silica, about 10 to about 35 weight percent magnesia, about 0.1 to about 10 weight percent calcia, and about 0.1 to about 0.5 weight percent lithium oxide.

According to certain illustrative embodiments, the inorganic fiber comprises the fiberization product of about 65 to about 86 weight percent silica, about 10 to about 35 weight percent magnesia, greater than 1 to about 15 weight percent calcia, about 0.1 to about 2 weight percent lithium oxide, and about 0.1 to about 5 weight percent alumina.

According to certain illustrative embodiments, the inorganic fiber comprises the fiberization product of about 70 to about 82 weight percent silica, about 10 to about 25 weight percent magnesia, greater than 1 to about 15 weight percent calcia, about 0.1 to about 2 weight percent lithium oxide, and about 0.1 to about 5 weight percent alumina.

According to certain illustrative embodiments, the inorganic fiber comprises the fiberization product of about 70 to about 82 weight percent silica, about 10 to about 25 weight percent magnesia, greater than 1 to about 15 weight percent calcia, about 0.1 to about 1.5 weight percent lithium oxide, and about 0.1 to about 5 weight percent alumina.

According to certain illustrative embodiments, the inorganic fiber comprises the fiberization product of about 70 to about 82 weight percent silica, about 10 to about 25 weight percent magnesia, greater than 1 to about 15 weight percent calcia, about 0.1 to about 1 weight percent lithium oxide, and about 0.1 to about 5 weight percent alumina.

According to certain illustrative embodiments, the inorganic fiber comprises the fiberization product of about 70 to about 82 weight percent silica, about 10 to about 25 weight percent magnesia, greater than 1 to about 15 weight percent calcia, about 0.1 to about 0.8 weight percent lithium oxide, and about 0.1 to about 5 weight percent alumina.

According to certain illustrative embodiments, the inorganic fiber comprises the fiberization product of about 70 to about 82 weight percent silica, about 10 to about 25 weight percent magnesia, greater than 1 to about 15 weight percent calcia, about 0.1 to about 0.5 weight percent lithium oxide, and about 0.1 to about 5 weight percent alumina.

According to certain illustrative embodiments, the inorganic fiber comprises the fiberization product of about 65 to about 86 weight percent silica, about 10 to about 35 weight percent magnesia, greater than 0 to about 15 weight percent calcia, about 0.5 to about 2 weight percent lithium oxide, and greater than 0 to about 5 weight percent alumina.

According to certain illustrative embodiments, the inorganic fiber comprises the fiberization product of about 65 to about 86 weight percent silica, about 10 to about 35 weight percent magnesia, greater than 1 to about 15 weight percent calcia, about 0.5 to about 2 weight percent lithium oxide, and about 0.1 to about 5 weight percent alumina.

According to certain illustrative embodiments, the inorganic fiber comprises the fiberization product of about 65 to about 86 weight percent silica, about 10 to about 25 weight percent magnesia, greater than 1 to about 15 weight percent calcia, about 0.5 to about 2 weight percent lithium oxide, and greater than 0 to about 5 weight percent alumina.

According to certain illustrative embodiments, the inorganic fiber comprises the fiberization product of about 70 to about 82 weight percent silica, about 10 to about 25 weight percent magnesia, greater than 1 to about 15 weight percent calcia, about 0.5 to about 3 weight percent lithium oxide, and about 0.1 to about 5 weight percent alumina.

According to certain illustrative embodiments, the inorganic fiber comprises the fiberization product of about 70 to about 82 weight percent silica, about 10 to about 25 weight percent magnesia, greater than 1 to about 15 weight percent calcia, about 0.5 to about 2.5 weight percent lithium oxide, and about 0.1 to about 5 weight percent alumina.

According to certain illustrative embodiments, the inorganic fiber comprises the fiberization product of about 70 to about 82 weight percent silica, about 10 to about 25 weight percent magnesia, greater than 1 to about 15 weight percent calcia, about 0.5 to about 2 weight percent lithium oxide, and about 0.1 to about 5 weight percent alumina.

According to certain illustrative embodiments, the inorganic fiber comprises the fiberization product of about 70 to about 82 weight percent silica, about 10 to about 25 weight percent magnesia, greater than 1 to about 15 weight percent calcia, about 0.5 to about 1.5 weight percent lithium oxide, and about 0.1 to about 5 weight percent alumina.

According to certain illustrative embodiments, the inorganic fiber comprises the fiberization product of about 70 to about 82 weight percent silica, about 10 to about 25 weight percent magnesia, greater than 1 to about 15 weight percent calcia, about 0.5 to about 1 weight percent lithium oxide, and about 0.1 to about 5 weight percent alumina.

According to certain illustrative embodiments, the inorganic fiber comprises the fiberization product of about 65 to about 86 weight percent silica, about 10 to about 35 weight percent magnesia, greater than 0 to about 15 weight percent calcia, about 1 to about 2 weight percent lithium oxide, and greater than 0 to about 5 weight percent alumina.

According to certain illustrative embodiments, the inorganic fiber comprises the fiberization product of about 65 to about 86 weight percent silica, about 10 to about 35 weight percent magnesia, greater than 0 to about 15 weight percent calcia, about 1.5 to about 2 weight percent lithium oxide, and greater than 0 to about 5 weight percent alumina.

According to certain illustrative embodiments, the inorganic fiber comprises the fiberization product of about 70 to about 82 weight percent silica, about 10 to about 25 weight percent magnesia, greater than 1 to about 15 weight percent calcia, about 1 to about 2 weight percent lithium oxide, and about 0.1 to about 5 weight percent alumina.

According to certain illustrative embodiments, the inorganic fiber comprises the fiberization product of about 65 to about 86 weight percent silica, about 10 to about 35 weight percent magnesia, greater than 0 to about 6 weight percent calcia, greater than 0 to about 2 weight percent lithium oxide, and greater than 0 to about 5 weight percent alumina.

According to certain illustrative embodiments, the inorganic fiber comprises the fiberization product of about 65 to about 86 weight percent silica, about 10 to about 35 weight percent magnesia, greater than 0 to about 6 weight percent calcia, greater than 0 to about 1 weight percent lithium oxide, and greater than 0 to about 5 weight percent alumina.

According to certain illustrative embodiments, the inorganic fiber comprises the fiberization product of about 65 to about 86 weight percent silica, about 10 to about 35 weight percent magnesia, greater than 0 to about 6 weight percent calcia, greater than 0 to about 0.5 weight percent lithium oxide, and greater than 0 to about 5 weight percent alumina.

According to certain illustrative embodiments, the inorganic fiber comprises the fiberization product of about 65 to about 86 weight percent silica, about 10 to about 35 weight percent magnesia, greater than 1 to about 6 weight percent calcia, about 0.1 to about 2 weight percent lithium oxide, and about 0.1 to about 5 weight percent alumina.

According to certain illustrative embodiments, the inorganic fiber comprises the fiberization product of about 65 to about 86 weight percent silica, about 10 to about 35 weight percent magnesia, greater than 1 to about 6 weight percent calcia, about 0.1 to about 1 weight percent lithium oxide, and about 0.1 to about 5 weight percent alumina.

According to certain illustrative embodiments, the inorganic fiber comprises the fiberization product of about 70 to about 82 weight percent silica, about 10 to about 25 weight percent magnesia, greater than 1 to about 6 weight percent calcia, about 0.1 to about 2 weight percent lithium oxide, and about 0.1 to about 5 weight percent alumina.

According to certain illustrative embodiments, the inorganic fiber comprises the fiberization product of about 70 to about 82 weight percent silica, about 10 to about 25 weight percent magnesia, greater than 1 to about 6 weight percent calcia, about 0.1 to about 1 weight percent lithium oxide, and about 0.1 to about 5 weight percent alumina.

According to certain illustrative embodiments, the inorganic fiber comprises the fiberization product of about 65 to about 86 weight percent silica, about 10 to about 35 weight percent magnesia, greater than 0 to about 3 weight percent calcia, greater than 0 to about 2 weight percent lithium oxide, and greater than 0 to about 5 weight percent alumina.

According to certain illustrative embodiments, the inorganic fiber comprises the fiberization product of about 65 to about 86 weight percent silica, about 10 to about 35 weight percent magnesia, greater than 0 to about 3 weight percent calcia, greater than 0 to about 1 weight percent lithium oxide, and greater than 0 to about 5 weight percent alumina.

According to certain illustrative embodiments, the inorganic fiber comprises the fiberization product of about 65 to about 86 weight percent silica, about 10 to about 35 weight percent magnesia, greater than 0 to about 3 weight percent calcia, greater than 0 to about 0.5 weight percent lithium oxide, and greater than 0 to about 5 weight percent alumina.

According to certain illustrative embodiments, the inorganic fiber comprises the fiberization product of about 65 to about 86 weight percent silica, about 10 to about 35 weight percent magnesia, greater than 1 to about 3 weight percent calcia, about 0.1 to about 2 weight percent lithium oxide, and about 0.1 to about 5 weight percent alumina.

According to certain illustrative embodiments, the inorganic fiber comprises the fiberization product of about 65 to about 86 weight percent silica, about 10 to about 35 weight percent magnesia, greater than 1 to about 3 weight percent calcia, about 0.1 to about 1 weight percent lithium oxide, and about 0.1 to about 5 weight percent alumina.

According to certain illustrative embodiments, the inorganic fiber comprises the fiberization product of about 70 to about 82 weight percent silica, about 10 to about 25 weight percent magnesia, greater than 1 to about 3 weight percent calcia, about 0.1 to about 2 weight percent lithium oxide, and about 0.1 to about 5 weight percent alumina.

According to certain illustrative embodiments, the inorganic fiber comprises the fiberization product of about 70 to about 82 weight percent silica, about 10 to about 25 weight percent magnesia, greater than 1 to about 3 weight percent calcia, about 0.1 to about 1 weight percent lithium oxide, and about 0.1 to about 5 weight percent alumina.

According to certain illustrative embodiments, the inorganic fiber comprises the fiberization product of about 75 to about 82 weight percent silica, about 12 to about 25 weight percent magnesia, greater than 0 to about 3 weight percent calcia, greater than 0 to about 0.5 weight percent lithium oxide, and greater than 0 to about 3 weight percent alumina.

According to certain illustrative embodiments, the inorganic fiber comprises the fiberization product of about 75 to about 82 weight percent silica, about 12 to about 25 weight percent magnesia, greater than 0 to about 3 weight percent calcia greater than 0 to about 0.25 weight percent lithium oxide, and greater than 0 to about 3 weight percent alumina.

According to certain illustrative embodiments, the inorganic fiber comprises the fiberization product of about 75 to about 82 weight percent silica, about 12 to about 25 weight percent magnesia, greater than 0 to about 3 weight percent calcia, greater than 0 to about 0.1 weight percent lithium oxide, and greater than 0 to about 3 weight percent alumina.

According to certain illustrative embodiments, the inorganic fiber comprises the fiberization product of about 75 to about 82 weight percent silica, about 12 to about 25 weight percent magnesia, greater than 1 to about 3 weight percent calcia, about 0.1 to about 1 weight percent lithium oxide, and about 0.1 to about 3 weight percent alumina.

According to certain illustrative embodiments, the inorganic fiber comprises the fiberization product of about 75 to about 82 weight percent silica, about 12 to about 25 weight percent magnesia, greater than 1 to about 3 weight percent calcia, about 0.1 to about 0.8 weight percent lithium oxide, and about 0.1 to about 3 weight percent alumina.

According to certain illustrative embodiments, the inorganic fiber comprises the fiberization product of about 75 to about 82 weight percent silica, about 12 to about 25 weight percent magnesia, greater than 1 to about 3 weight percent calcia, about 0.1 to about 0.5 weight percent lithium oxide, and about 0.1 to about 3 weight percent alumina.

According to certain illustrative embodiments, the inorganic fiber comprises the fiberization product of about 75 to about 82 weight percent silica, greater than 0 to about 22 weight percent magnesia, greater than about 3 weight percent calcia, greater than 0 to about 1 weight percent lithium oxide, and greater than 0 to about 3 weight percent alumina.

According to certain illustrative embodiments, the inorganic fiber comprises the fiberization product of about 75 to about 82 weight percent silica, greater than 5 to about 22 weight percent magnesia, greater than about 3 weight percent calcia, about 0.1 to about 1 weight percent lithium oxide, and about 0.1 to about 3 weight percent alumina.

According to certain illustrative embodiments, the inorganic fiber comprises the fiberization product of about 75 to about 82 weight percent silica, greater than 0 to about 22 weight percent magnesia, greater than about 4 weight percent calcia, greater than 0 to about 1 weight percent lithium oxide, and greater than 0 to about 3 weight percent alumina.

According to certain illustrative embodiments, the inorganic fiber comprises the fiberization product of about 75 to about 82 weight percent silica, greater than 5 to about 22 weight percent magnesia, greater than about 4 weight percent calcia, about 0.1 to about 1 weight percent lithium oxide, and about 0.1 to about 3 weight percent alumina.

According to certain illustrative embodiments, the inorganic fiber comprises the fiberization product of about 75 to about 82 weight percent silica, greater than 0 to about 22 weight percent magnesia, greater than about 5 weight percent calcia, greater than 0 to about 1 weight percent lithium oxide, and greater than 0 to about 3 weight percent alumina.

According to certain illustrative embodiments, the inorganic fiber comprises the fiberization product of about 75 to about 82 weight percent silica, greater than 5 to about 22 weight percent magnesia, greater than about 5 weight percent calcia, about 0.1 to about 1 weight percent lithium oxide, and about 0.1 to about 3 weight percent alumina.

According to certain illustrative embodiments, the inorganic fiber comprises the fiberization product of about 75 to about 82 weight percent silica, greater than 0 to about 22 weight percent magnesia, greater than about 6 weight percent calcia, greater than 0 to about 1 weight percent lithium oxide, and greater than 0 to about 3 weight percent alumina.

According to certain illustrative embodiments, the inorganic fiber comprises the fiberization product of about 75 to about 82 weight percent silica, greater than 5 to about 22 weight percent magnesia, greater than about 6 weight percent calcia, about 0.1 to about 1 weight percent lithium oxide, and about 0.1 to about 3 weight percent alumina.

According to certain illustrative embodiments, the inorganic fiber comprises the fiberization product of about 70 to about 80 weight percent silica, about 15 to about 30 weight percent magnesia, lithium oxide and calcia.

According to certain illustrative embodiments, the inorganic fiber comprises the fiberization product of about 70 to about 80 weight percent silica, about 15 to about 30 weight percent magnesia, greater than 0 to about 2 weight percent lithium oxide and about 15 to about 30 weight percent calcia.

According to certain illustrative embodiments, the inorganic fiber comprises the fiberization product of about 70 to about 80 weight percent silica, about 15 to about 30 weight percent magnesia, about 0.1 to about 2 weight percent lithium oxide and about 15 to about 30 weight percent calcia.

According to certain illustrative embodiments, the inorganic fiber comprises the fiberization product of about 70 to about 80 weight percent silica, about 15 to about 30 weight percent magnesia, greater than 0 to about 1 weight percent lithium oxide and about 15 to about 30 weight percent calcia.

According to certain illustrative embodiments, the inorganic fiber comprises the fiberization product of about 70 to about 80 weight percent silica, about 15 to about 30 weight percent magnesia, about 0.1 to about 1 weight percent lithium oxide and about 15 to about 30 weight percent calcia.

According to certain illustrative embodiments, the inorganic fiber comprises the fiberization product of about 70 to about 80 weight percent silica, about 15 to about 30 weight percent magnesia, greater than 0 to about 0.75 weight percent lithium oxide and about 15 to about 30 weight percent calcia.

According to certain illustrative embodiments, the inorganic fiber comprises the fiberization product of about 70 to about 80 weight percent silica, about 15 to about 30 weight percent magnesia, about 0.1 to about 0.75 weight percent lithium oxide and about 15 to about 30 weight percent calcia.

According to certain illustrative embodiments, the inorganic fiber comprises the fiberization product of about 70 to about 80 weight percent silica, about 15 to about 30 weight percent magnesia, about 15 to about 30 weight percent calcium oxide, and lithium oxide wherein the amount of lithium oxide may be selected from greater than 0 to about 1 weight percent lithium oxide, greater than 0 to about 0.9 weight percent lithium oxide, greater than 0 to about 0.8 weight percent lithium oxide, greater than 0 to about 0.7 weight percent lithium oxide, greater than 0 to about 0.6 weight percent lithium oxide, greater than 0 to about 0.5 weight percent lithium oxide, greater than 0 to about 0.4 weight percent lithium oxide, greater than 0 to about 0.3 weight percent lithium oxide, or greater than 0 to about 0.25 weight percent lithium oxide, greater than 0 to about 0.2 weight percent lithium oxide, greater than 0 to about 0.175 weight percent lithium oxide, greater than 0 to about 0.15 weight percent lithium oxide, greater than 0 to about 0.125 weight percent lithium oxide, greater than 0 to about 0.1 weight percent lithium oxide, greater than 0 to about 0.075 weight percent lithium oxide, greater than 0 to about 0.05 weight percent lithium oxide, greater than 0 to about 0.025 weight percent lithium oxide, greater than 0 to about 0.0125 weight percent lithium oxide, or greater than 0 to about 0.01 weight percent lithium oxide.

According to certain illustrative embodiments, the inorganic fiber comprises the fiberization product of about 70 to about 80 weight percent silica, about 15 to about 30 weight percent magnesia, greater than 0 to about 2 weight percent lithium oxide, about 15 to about 30 weight calcia and greater than 0 to about 5 weight percent alumina.

According to certain illustrative embodiments, the inorganic fiber comprises the fiberization product of about 70 to about 80 weight percent silica, about 15 to about 30 weight percent magnesia, about 0.1 to about 2 weight percent lithium oxide, about 15 to about 30 weight percent calcia and greater than 0 to about 5 weight percent alumina.

According to certain illustrative embodiments, the inorganic fiber comprises the fiberization product of about 70 to about 80 weight percent silica, about 15 to about 30 weight percent magnesia, about 0.1 to about 1 weight percent lithium oxide, about 15 to about 30 weight percent calcia and greater than 0 to about 5 weight percent alumina.

According to certain illustrative embodiments, the inorganic fiber comprises the fiberization product of about 70 to about 80 weight percent silica, about 15 to about 30 weight percent magnesia, greater than 0 to about 2 weight percent lithium oxide, about 15 to about 30 weight percent calcia and greater than 0 to about 5 weight percent boria.

According to certain illustrative embodiments, the inorganic fiber comprises the fiberization product of about 70 to about 80 weight percent silica, about 15 to about 30 weight percent magnesia, greater than 0 to about 2 weight percent lithium oxide, about 15 to about 30 weight percent calcia and greater than 0 to about 5 weight percent of a combination of alumina and boria.

According to certain illustrative embodiments, the inorganic fiber comprises the fiberization product of about 70 to about 80 weight percent silica, about 15 to about 30 weight percent magnesia, greater than 0 to about 1 weight percent lithium oxide, about 15 to about 30 weight percent calcia and greater than 0 to about 5 weight percent alumina.

According to certain illustrative embodiments, the inorganic fiber comprises the fiberization product of about 70 to about 80 weight percent silica, about 15 to about 30 weight percent magnesia, greater than 0 to about 1 weight percent lithium oxide, about 15 to about 30 weight percent calcia and greater than 0 to about 5 weight percent boria.

According to certain illustrative embodiments, the inorganic fiber comprises the fiberization product of about 70 to about 80 weight percent silica, about 15 to about 30 weight percent magnesia, greater than 0 to about 1 weight percent lithium oxide, about 15 to about 30 weight percent calcia and greater than 0 to about 5 weight percent of a combination of alumina and boria.

According to certain illustrative embodiments, the inorganic fiber comprises the fiberization product of about 70 to about 80 weight percent silica, about 15 to about 30 weight percent magnesia, greater than 0 to about 0.5 weight percent lithium oxide, about 15 to about 30 weight percent calcium oxide and greater than 0 to about 5 weight percent alumina.

According to certain illustrative embodiments, the inorganic fiber comprises the fiberization product of about 70 to about 80 weight percent silica, about 15 to about 30 weight percent magnesia, about 0.5 to about 2 weight percent lithium oxide, about 15 to about 30 weight percent calcium oxide and about 0.1 to about 5 weight percent alumina.

According to certain illustrative embodiments, the inorganic fiber comprises the fiberization product of about 70 to about 80 weight percent silica, about 15 to about 30 weight percent magnesia, greater than 0 to about 0.5 weight percent lithium oxide, about 15 to about 30 weight percent calcia and greater than 0 to about 5 weight percent boria.

According to certain illustrative embodiments, the inorganic fiber comprises the fiberization product of about 70 to about 80 weight percent silica, about 15 to about 30 weight percent magnesia, greater than 0 to about 0.5 weight percent lithium oxide, about 15 to about 30 weight percent calcium oxide and greater than 0 to about 5 weight percent of a combination of alumina and boria.

According to certain illustrative embodiments, the inorganic fiber comprises the fiberization product of about 79 weight percent silica, about 20 weight percent magnesia, greater than 0 to about 0.4 weight percent lithium oxide, greater than 0 to about 6 weight percent calcia and greater than 0 to about 1.5 weight percent of alumina.

According to certain illustrative embodiments, the inorganic fiber comprises the fiberization product of about 76 to about 82 weight percent silica, about 10 to about 19 weight percent magnesia, about 0.1 to about 1 weight percent lithium oxide, greater than 1 to about 6 weight percent calcia and about 0.5 to about 1.5 weight percent of alumina.

According to certain illustrative embodiments, the inorganic fiber comprises the fiberization product of about 76 to about 82 weight percent silica, about 10 to about 19 weight percent magnesia, about 0.1 to about 0.75 weight percent lithium oxide, greater than 1 to about 6 weight percent calcia and about 0.5 to about 1.5 weight percent of alumina.

According to certain illustrative embodiments, the inorganic fiber comprises the fiberization product of about 76 to about 82 weight percent silica, about 10 to about 19 weight percent magnesia, about 0.1 to about 0.5 weight percent lithium oxide, greater than 1 to about 6 weight percent calcia and about 0.5 to about 1.5 weight percent of alumina.

According to certain illustrative embodiments, the inorganic fiber comprises the fiberization product of about 76 to about 82 weight percent silica, about 10 to about 19 weight percent magnesia, about 0.1 to about 1 weight percent lithium oxide, greater than 1 to about 5 weight percent calcia and about 0.5 to about 1.5 weight percent of alumina.

According to certain illustrative embodiments, the inorganic fiber comprises the fiberization product of about 76 to about 82 weight percent silica, about 10 to about 19 weight percent magnesia, about 0.1 to about 1 weight percent lithium oxide, greater than 1 to about 4 weight percent calcia and about 0.5 to about 1.5 weight percent of alumina.

According to certain illustrative embodiments, the inorganic fiber comprises the fiberization product of about 76 to about 82 weight percent silica, about 10 to about 19 weight percent magnesia, about 0.1 to about 1 weight percent lithium oxide, greater than 1 to about 3 weight percent calcia and about 0.5 to about 1.5 weight percent of alumina.

According to certain illustrative embodiments, the inorganic fiber comprises the fiberization product of about 76 to about 82 weight percent silica, about 10 to about 19 weight percent magnesia, about 0.1 to about 1 weight percent lithium oxide, greater than 1 to about 2 weight percent calcia and about 0.5 to about 1.5 weight percent of alumina.

According to certain illustrative embodiments, the inorganic fiber comprises the fiberization product of about 76 to about 82 weight percent silica, about 10 to about 19 weight percent magnesia, about 0.5 to about 1.5 weight percent lithium oxide, greater than 1 to about 6 weight percent calcia and about 0.5 to about 1.5 weight percent of alumina.

According to certain illustrative embodiments, the inorganic fiber comprises the fiberization product of about 76 to about 82 weight percent silica, about 10 to about 19 weight percent magnesia, about 0.5 to about 1.5 weight percent lithium oxide, greater than 1 to about 5 weight percent calcia and about 0.5 to about 1.5 weight percent of alumina.

According to certain illustrative embodiments, the inorganic fiber comprises the fiberization product of about 76 to about 82 weight percent silica, about 10 to about 19 weight percent magnesia, about 0.5 to about 1.5 weight percent lithium oxide, greater than 1 to about 4 weight percent calcia and about 0.5 to about 1.5 weight percent of alumina.

According to certain illustrative embodiments, the inorganic fiber comprises the fiberization product of about 76 to about 82 weight percent silica, about 10 to about 19 weight percent magnesia, about 0.5 to about 1.5 weight percent lithium oxide, greater than 1 to about 3 weight percent calcia and about 0.5 to about 1.5 weight percent of alumina.

According to certain illustrative embodiments, the inorganic fiber comprises the fiberization product of about 76 to about 82 weight percent silica, about 10 to about 19 weight percent magnesia, about 0.5 to about 1.5 weight percent lithium oxide, greater than 1 to about 2 weight percent calcia and about 0.5 to about 1.5 weight percent of alumina.

According to certain illustrative embodiments, the inorganic fiber comprises the fiberization product of about 75 to about 82 weight percent silica, about 12 to about 25 weight percent magnesia, about 1 to about 3 weight percent calcia, and greater than 0 to about 2 weight percent lithia.

According to certain illustrative embodiments, the inorganic fiber comprises the fiberization product of about 75 to about 82 weight percent silica, about 12 to about 25 weight percent magnesia, about 1 to about 3 weight percent calcia, and greater than 0 to about 1 weight percent lithia.

According to certain illustrative embodiments, the inorganic fiber comprises the fiberization product of about 75 to about 82 weight percent silica, about 12 to about 25 weight percent magnesia, about 1 to about 3 weight percent calcia, and greater than 0 to about 0.75 weight percent lithia.

According to certain illustrative embodiments, the inorganic fiber comprises the fiberization product of about 75 to about 82 weight percent silica, about 12 to about 25 weight percent magnesia, about 1 to about 3 weight percent calcia, and greater than 0 to about 0.5 weight percent lithia.

According to certain illustrative embodiments, the inorganic fiber comprises the fiberization product of about 75 to about 82 weight percent silica, about 12 to about 25 weight percent magnesia, about 1 to about 3 weight percent calcia, greater than 0 to about 1 weight percent lithia, and greater than 0 to about 3 weight percent alumina.

According to certain illustrative embodiments, the inorganic fiber comprises the fiberization product of about 75 to about 82 weight percent silica, about 5 to about 25 weight percent magnesia, greater than 3 weight percent calcia, and greater than 0 to about 2 weight percent lithia.

According to certain illustrative embodiments, the inorganic fiber comprises the fiberization product of about 75 to about 82 weight percent silica, about 5 to about 25 weight percent magnesia, greater than 3 weight percent calcia, and greater than 0 to about 1 weight percent lithia.

According to certain illustrative embodiments, the inorganic fiber comprises the fiberization product of about 75 to about 82 weight percent silica, about 5 to about 25 weight percent magnesia, greater than 3 weight percent calcia, and greater than 0 to about 0.75 weight percent lithia.

According to certain illustrative embodiments, the inorganic fiber comprises the fiberization product of about 75 to about 82 weight percent silica, about 5 to about 25 weight percent magnesia, greater than 3 weight percent calcia, and greater than 0 to about 0.5 weight percent lithia.

According to certain illustrative embodiments, the inorganic fiber comprises the fiberization product of about 75 to about 82 weight percent silica, about 5 to about 25 weight percent magnesia, greater than 3 weight percent calcia, greater than 0 to about 1 weight percent lithia, and greater than 0 to about 3 weight percent alumina.

According to certain illustrative embodiments, the inorganic fiber comprises the fiberization product of about 75 to about 82 weight percent silica, about 5 to about 25 weight percent magnesia, about 3 to about 6 weight percent calcia, and greater than 0 to about 2 weight percent lithia.

In connection with all of the described embodiments of the inorganic fiber, and based on the amount of calcia recited in a given embodiment, in addition to magnesia, silica, a given fiber composition may contain the intended calcia addition in an amount of greater than 0 to about 10 weight percent, in an amount of greater than 0 to about 7.5 weight percent, in an amount of greater than 0 to about 7 weight percent, in an amount of greater than 0 to about 6.5 weight percent, in an amount of greater than 0 to about 6 weight percent, in an amount of greater than 0 to about 5.5 weight percent, in an amount of greater than 0 to about 5 weight percent, in an amount of greater than 0 to about 4.5 weight percent, in an amount of greater than 0 to about 4 weight percent, in an amount of greater than 0 to about 3.5 weight percent, in an amount of greater than 0 to about 3 weight percent, in an amount of greater than 0 to about 2.5 weight percent, in an amount of greater than 0 to about 2 weight percent, in an amount of greater than 0 to about 1.5 weight percent, in an amount of greater than 0 to about 1 weight percent, in an amount of greater than 0 to about 0.5 weight percent, in an amount of greater than 0 to about 0.25 weight percent, in an amount of about 0.1 to about 10 weight percent, in an amount of about 0.1 to about 9 weight percent, in an amount of about 0.1 to about 7.5 weight percent, in an amount of about 0.1 to about 7 weight percent, in an amount of about 0.1 to about 6.5 weight percent, in an amount of about 0.1 to about 6 weight percent, in an amount of about 0.1 to about 5.5 weight percent, in an amount of about 0.1 to about 5 weight percent, in an amount of about 0.1 to about 4.5 weight percent, in an amount of about 0.1 to about 4 weight percent, in an amount of about 0.1 to about 3.5 weight percent, in an amount of about 0.1 to about 3 weight percent, in an amount of about 0.1 to about 2.5 weight percent, in an amount of about 0.1 to about 2 weight percent, in an amount of about 0.1 to about 1.5 weight percent, in an amount of about 0.1 to about 1 weight percent, in an amount of about 0.1 to about 0.5 weight percent, in an amount of about 0.1 to about 10 weight percent, in an amount of about 0.1 to about 0.25 weight percent, in an amount of about 0.5 to about 10 weight percent, in an amount of about 0.5 to about 9 weight percent, in an amount of about 0.5 to about 7.5 weight percent, in an amount of about 0.5 to about 7 weight percent, in an amount of about 0.5 to about 6.5 weight percent, in an amount of about 0.5 to about 6 weight percent, in an amount of about 0.5 to about 5.5 weight percent, in an amount of about 0.5 to about 5 weight percent, in an amount of about 0.5 to about 4.5 weight percent, in an amount of about 0.5 to about 4 weight percent, in an amount of about 0.5 to about 3.5 weight percent, in an amount of about 0.5 to about 3 weight percent, in an amount of about 0.5 to about 2.5 weight percent, in an amount of about 0.5 to about 2 weight percent, in an amount of about 0.5 to about 1.5 weight percent, in an amount of about 0.5 to about 1 weight, in an amount of about 1 to about 10 weight percent, in an amount of about 1.5 to about 10 weight percent, in an amount of about 2 to about 10 weight percent, in an amount of about 2.5 to about 10 weight percent, in an amount of about 3 to about 10 weight percent, in an amount of about 3.5 to about 10 weight percent, in an amount of about 4 to about 10 weight percent, in an amount of about 1 to about 6 weight percent, in an amount of about 1.5 to about 6 weight percent, in an amount of about 2 to about 6 weight percent, in an amount of about 2.5 to about 6 weight percent, in an amount of about 3 to about 6 weight percent, in an amount of about 3.5 to about 6 weight percent, in an amount of about 4 to about 6 weight percent, or in an amount of about 5 to about 6.

In connection with all of the described embodiments of the inorganic fiber, and based on the amount of lithium oxide recited in a given embodiment, in addition to magnesia, silica, a given fiber composition may contain the intended lithium oxide in an amount of greater than 0 to about 5 weight percent, in an amount of greater than 0 to about 4.5 weight percent, in an amount of greater than 0 to about 4 weight percent, in an amount of greater than 0 to about 3.5 weight percent, in an amount of greater than 0 to about 3 weight percent, in an amount of greater than 0 to about 2.5 weight percent, in an amount of greater than 0 to about 2 weight percent, in an amount of greater than 0 to about 1.5 weight percent, in an amount of greater than 0 to about 1 weight percent, in an amount of greater than 0 to about 0.8 weight percent, in an amount of greater than 0 to about 0.5 weight percent, in an amount of greater than 0 to about 0.3 weight percent, in an amount of about 0.1 to about 2 weight percent, in an amount of about 0.1 to about 1.5 weight percent, in an amount of about 0.1 to about 1 weight percent, in an amount of about 0.1 to about 0.9 weight percent, in an amount of about 0.1 to about 0.8 weight percent, in an amount of about 0.1 to about 0.7 weight percent, in an amount of about 0.1 to about 0.7 weight percent, in an amount of about 0.1 to about 0.6 weight percent, in an amount of about 0.1 to about 0.5 weight percent, in an amount of about 0.1 to about 0.4 weight percent, in an amount of about 0.1 to about 0.3 weight percent, in an amount of about 0.1 to about 0.2 weight percent, in an amount of about 0.2 to about 2 weight percent, in an amount of about 0.3 to about 2 weight percent, in an amount of about 0.4 to about 2 weight percent, in an amount of about 0.5 to about 2 weight percent, in an amount of about 0.6 to about 2 weight percent, in an amount of about 0.7 to about 2 weight percent, in an amount of about 0.8 to about 2 weight percent, in an amount of about 0.9 to about 2 weight percent, in an amount of about 1 to about 2 weight percent, in an amount of about 1.2 to about 2 weight percent, or in an amount of about 1.5 to about 2 weight percent.

In connection with all of the described embodiments of the inorganic fiber, and based on the amount of alumina recited in a given embodiment, in addition to magnesia, silica, an alkali metal oxide such as lithia and an additional alkaline earth oxide such as calcia, a given fiber composition may contain alumina in an amount of greater than 0 to about 4.5 weight percent, in an amount of greater than 0 to about 4 weight percent, in an amount of greater than 0 to about 3.5 weight percent, in an amount of greater than 0 to about 3 weight percent, in an amount of greater than 0 to about 2.5 weight percent, in an amount of greater than 0 to about 2 weight percent, in an amount of greater than 0 to about 1.5 weight percent, in an amount of greater than 0 to about 1 weight percent, in an amount of greater than 0 to about 0.8 weight percent, in an amount of greater than 0 to about 0.5 weight percent, in an amount of greater than 0 to about 0.3 weight percent, in an amount of about 0.1 to about 2 weight percent, in an amount of about 0.1 to about 1.5 weight percent, in an amount of about 0.1 to about 1 weight percent, in an amount of about 0.1 to about 0.9 weight percent, in an amount of about 0.1 to about 0.8 weight percent, in an amount of about 0.1 to about 0.7 weight percent, in an amount of about 0.1 to about 0.7 weight percent, in an amount of about 0.1 to about 0.6 weight percent, in an amount of about 0.1 to about 0.5 weight percent, in an amount of about 0.1 to about 0.4 weight percent, in an amount of about 0.1 to about 0.3 weight percent, in an amount of about 0.1 to about 0.2 weight percent, in an amount of about 0.2 to about 2 weight percent, in an amount of about 0.3 to about 2 weight percent, in an amount of about 0.4 to about 2 weight percent, in an amount of about 0.5 to about 2 weight percent, in an amount of about 0.6 to about 2 weight percent, in an amount of about 0.7 to about 2 weight percent, in an amount of about 0.8 to about 2 weight percent, in an amount of about 0.9 to about 2 weight percent, in an amount of about 1 to about 2 weight percent, in an amount of about 1.2 to about 2 weight percent, or in an amount of about 1.5 to about 2 weight percent.

In connection with all of the described embodiments of the inorganic fiber, and based on the amount of iron oxide recited in a given embodiment, in addition to magnesia, silica, an alkali metal oxide such as lithia and an additional alkaline earth oxide such as calcia, a given fiber composition may contain iron oxide in an amount of about 2 weight percent or less, in an amount of about 1.5 weight percent or less, in an amount of about 1 weight percent or less, in an amount of about 0.75 weight percent or less, in a range of about 0.1 to about 1, or in a range of about 0.1 to about 0.5.

According to any of the above inorganic fiber compositions, the high temperature resistant inorganic fiber exhibits a linear shrinkage of 5% or less when exposed to a use temperature of 1260° C. or greater for 24 hours, and maintains mechanical integrity after exposure to the use temperature, and which exhibits low biopersistence in physiological fluids.

According to any of the above inorganic fiber compositions, the high temperature resistant inorganic fiber exhibits a linear shrinkage of 4% or less when exposed to a use temperature of 1260° C. or greater for 24 hours, maintains mechanical integrity after exposure to the use temperature, and which exhibits low biopersistence in physiological fluids.

According to any of the above inorganic fiber compositions, provided is a high temperature resistant inorganic fiber which exhibits a linear shrinkage of 10% or less when exposed to a use temperature of 1400° C. or greater for 24 hours, and which maintains mechanical integrity after exposure to the use temperature, and which exhibits low biopersistence in physiological fluids.

According to any of the above embodiments, the high temperature resistant inorganic fiber exhibits a linear shrinkage of 5% or less when exposed to a use temperature of 1400° C. or greater for 24 hours, and which maintains mechanical integrity after exposure to the use temperature, and exhibit low biopersistence in physiological fluids.

Also provided is a method of making an inorganic fiber of any one of the above-described illustrative embodiments comprising (1) forming a molten melt of ingredients comprising silica, magnesia, and synergistic amounts of at least alkali metal oxide and at least one alkaline earth metal oxide that is different from magnesium oxide, optionally alumina, optionally boria, and optionally zirconia, and (2) forming fibers from the molten melt of ingredients.

According to certain embodiments, the method of making an inorganic fiber of any one of the above-described illustrative embodiments comprises (1) forming a molten melt of ingredients comprising silica, magnesia, and synergistic amounts of one alkali metal oxide and one alkaline earth metal oxide that is different from magnesia, optionally alumina, optionally boria, and optionally zirconia, and (2) forming fibers from the molten melt of ingredients.

According to certain embodiments, the method of making an inorganic fiber of any one of the above-described illustrative embodiment comprises (1) forming a molten melt of ingredients comprising silica, magnesia, and synergistic amounts of calcia and lithium oxide, optionally alumina, optionally boria, and optionally zirconia, and (2) forming fibers from the molten melt of ingredients.

The method for preparing the fiber comprises forming a molten melt of ingredients comprising from about 65 to about 86 weight percent silica, greater than 0 to about 35 weight percent magnesia, calcia, and lithium oxide, and forming fibers from the molten melt of ingredients.

The method for preparing the fiber comprises forming a molten melt of ingredients comprising from about 65 to about 86 weight percent silica, greater than 0 to about 35 weight percent magnesia, greater than 0 to about 35 weight percent calcia, and lithium oxide.

The method for preparing the fiber comprises forming a molten melt of ingredients comprising from about 65 to about 86 weight percent silica, greater than 0 to about 35 weight percent magnesia, greater than 0 to about 35 weight percent calcia, and greater than 0 to about 2 weight percent lithium oxide, and forming fibers from the molten melt of ingredients.

The method for preparing the fiber comprises forming a molten melt of ingredients comprising from about 65 to about 86 weight percent silica, greater than 0 to about 35 weight percent magnesia, greater than 0 to about 35 weight percent calcia, greater than 0 to about 2 weight percent lithium oxide, and greater than 0 to about 5 weight percent alumina, and forming fibers from the molten melt of ingredients.

The method for preparing the fiber comprises forming a molten melt of ingredients comprising from about 65 to about 86 weight percent silica, about 10 to about 35 weight percent magnesia, greater than 0 to about 15 weight percent calcia, greater than 0 to about 2 weight percent lithium oxide, and greater than 0 to about 5 weight percent alumina, and forming fibers from the molten melt of ingredients.

The method for preparing the fiber comprises forming a molten melt of ingredients comprising from about 75 to about 82 weight percent silica, about 12 to about 25 weight percent magnesia, greater than 0 to about 3 weight percent calcia, greater than 0 to about 0.1 weight percent lithium oxide, and greater than 0 to about 3 weight percent alumina, and forming fibers from the molten melt of ingredients.

The method for preparing the fiber comprises forming a molten melt of ingredients comprising from about 75 to about 82 weight percent silica, greater than 0 to about 22 weight percent magnesia, greater than about 3 weight percent calcia, greater than 0 to about 1 weight percent lithium oxide, and greater than 0 to about 3 weight percent alumina, and forming fibers from the molten melt of ingredients.

While several specific illustrative embodiments of the method of making the inorganic fiber have been recited hereinabove, it is to be noted that any amount of raw ingredients of the fiber compositions disclosed herein may be used in the method of making the fiber.

Also provided is a method of thermally insulating an article with fibrous insulation prepared from a plurality of the presently disclosed high temperature resistant low biopersistent inorganic fibers of any of the above disclosed illustrative embodiments.

The method includes disposing on, in, near or around the article to be thermally insulated, a thermal insulation material comprising a plurality of any one of the disclosed inorganic fibers comprising the fiberization product of silica, magnesia, and synergistic amounts of at least one alkali metal oxide and at least one alkaline earth metal oxide that is different from magnesia, optionally alumina, optionally boria, and optionally zirconia.

The method includes disposing on, in, near or around the article to be thermally insulated, a thermal insulation material comprising a plurality of the inorganic fibers comprising the fiberization product of silica, magnesia, and synergistic amounts of lithium oxide and calcia, optionally alumina, optionally boria, and optionally zirconia.

The method includes disposing on, in, near or around the article to be thermally insulated, a thermal insulation material comprising a plurality of the inorganic fibers comprising the fiberization product of about 65 to about 86 weight percent silica, greater than 0 to about 35 weight percent magnesia, calcia, and lithium oxide.

The method includes disposing on, in, near or around the article to be thermally insulated, a thermal insulation material comprising a plurality of the inorganic fibers comprising the fiberization product of about 65 to about 86 weight percent silica, greater than 0 to about 35 weight percent magnesia, greater than 0 to about 35 weight percent calcia, and lithium oxide.

The method includes disposing on, in, near or around the article to be thermally insulated, a thermal insulation material comprising a plurality of the inorganic fibers comprising the fiberization product of about 65 to about 86 weight percent silica, greater than 0 to about 35 weight percent magnesia, greater than 0 to about 35 weight percent calcia, and greater than 0 to about 2 weight percent lithium oxide.

The method includes disposing on, in, near or around the article to be thermally insulated, a thermal insulation material comprising a plurality of the inorganic fibers comprising the fiberization product of about 65 to about 86 weight percent silica, greater than 0 to about 35 weight percent magnesia, greater than 0 to about 35 weight percent calcia, greater than 0 to about 2 weight percent lithium oxide, and greater than 0 to about 5 weight percent alumina.

The method includes disposing on, in, near or around the article to be thermally insulated, a thermal insulation material comprising a plurality of the inorganic fibers comprising the fiberization product of about 65 to about 86 weight percent silica, about 10 to about 35 weight percent magnesia, greater than 0 to about 15 weight percent calcia, greater than 0 to about 2 weight percent lithium oxide, and greater than 0 to about 5 weight percent alumina.

The method includes disposing on, in, near or around the article to be thermally insulated, a thermal insulation material comprising a plurality of the inorganic fibers comprising the fiberization product of about 75 to about 82 weight percent silica, about 12 to about 25 weight percent magnesia, greater than 0 to about 3 weight percent calcia, greater than 0 to about 0.1 weight percent lithium oxide, and greater than 0 to about 3 weight percent alumina.

The method includes disposing on, in, near or around the article to be thermally insulated, a thermal insulation material comprising a plurality of the inorganic fibers comprising the fiberization product of about 75 to about 82 weight percent silica, greater than 0 to about 22 weight percent magnesia, greater than 0 about 3 weight percent calcia, greater than 0 to about 1 weight percent lithium oxide, and greater than 0 to about 3 weight percent alumina.

While several specific illustrative embodiments of the method of making the inorganic fiber have been recited hereinabove, it is to be noted that any of the disclosed inorganic fiber compositions may be used in the method of insulating an article.

Also provided is an inorganic fiber containing article comprising a plurality of the inorganic fibers of any one of the above-described illustrative embodiments in the form of blankets, blocks, boards, caulking compositions, cement compositions, coatings, felts, mats, moldable compositions, modules, papers, pumpable compositions, putty compositions, sheets, tamping mixtures, vacuum cast shapes, vacuum cast forms, or woven textiles (for example, without limitation, braids, cloths, fabrics, ropes, tapes, sleeving, wicking).

In order for a glass composition to be a viable candidate for producing a satisfactory high temperature resistant fiber product, the fiber to be produced must be manufacturable, sufficiently soluble (i.e., having low biopersistence) in physiological fluids, and capable of surviving high temperatures with minimal shrinkage and minimal loss of mechanical integrity during exposure to the high service temperatures.

The present inorganic fiber exhibits low biopersistence in physiological fluids. By "low biopersistence" in physiological fluids, it is meant that the inorganic fiber at least partially dissolves in such fluids, such as simulated lung fluid, during in vitro tests.

Biopersistence may be tested by measuring the rate at which mass is lost from the fiber (ng/cm$^2$-hr) under conditions which simulate the temperature and chemical conditions found in the human lung. This test consists of exposing approximately 0.1 g of de-shotted fiber to 50 ml of simulated lung fluid ("SLF") for 6 hours. The entire test system is maintained at 37° C., to simulate the temperature of the human body.

After the SLF has been exposed to the fiber, it is collected and analyzed for glass constituents using Inductively Coupled Plasma Spectroscopy. A "blank" SLF sample is also measured and used to correct for elements present in the SLF. Once this data has been obtained, it is possible to calculate the rate at which the fiber has lost mass over the time interval of the study. The fibers are significantly less biopersistent than normal refractory ceramic fiber in simulated lung fluid, and are at least as soluble as magnesium-silicate fibers without the intended addition of calcia and lithium oxide.

To measure the dissolution rate of fibers in simulated lung fluid, approximately 0.1 g of fiber is placed into a 50 ml centrifuge tube containing simulated lung fluid which has been warmed to 37° C. This is then placed into a shaking incubator for 6 hours and agitated at 100 cycles per minute. At the conclusion of the test, the tube is centrifuged and the solution is poured into a 60 ml syringe. The solution is then forced through a 0.45 μm filter to remove any particulate and tested for glass constituents using Inductively Coupled Plasma Spectroscopy analysis. This test may be conducted using either a near-neutral pH solution or an acidic solution. Although no specific dissolution rate standards exist, fibers with dissolution values in excess of 100 ng/cm$^2$-hr are considered indicative of a non-biopersistent fiber. The composition for the simulated lung fluid, which was used to test the durability of the fiber compositions of the present invention:

| Constituent | Amount/Make-up |
|---|---|
| NH$_4$Cl | 10.72 g/50 mL |
| NaCl | 135.6 g |
| NaHCO$_3$ | 45.36 g |
| NaH$_2$PO$_4$•H$_2$O solution | 3.31 g/50 mL |
| Na$_3$C$_6$H$_5$O$_7$•H$_2$O solution | 1.18 g/50 mL |
| Glycine | 9.08 g |
| H$_2$SO$_4$ (1N solution) | 20.0 mL |
| CaCl$_2$ (2.75 wt. % solution) | 15.8 mL |
| Formaldehyde | 20.0 mL |

To approximately 18 liters of deionized water, sequentially add the above reagents in the amounts shown in the above table. Dilute the mixture to 20 liters with deionized water and continue to stir contents with magnetic stir bar or other suitable means for at least 15 minutes.

"Viscosity" refers to the ability of a glass melt to resist flow or shear stress. The viscosity-temperature relationship is critical in determining whether it is possible to fiberize a given glass composition. An optimum viscosity curve would have a low viscosity (5-50 poise) at the fiberization temperature and would gradually increase as the temperature decreased. If the melt is not sufficiently viscous (i.e. too thin) at the fiberization temperature, the result is a short, thin fiber, with a high proportion of unfiberized material (shot). If the melt is too viscous at the fiberization temperature, the resulting fiber will be extremely coarse (high diameter) and short.

Viscosity is dependent upon melt chemistry, which is also affected by elements or compounds that act as viscosity modifiers. Viscosity modifiers permit fibers to be blown or spun from the fiber melt. It is desirable, however, that such viscosity modifiers, either by type or amount, do not adversely impact the solubility, shrink resistance, or mechanical strength of the blown or spun fiber.

One approach to testing whether a fiber of a defined composition can be readily manufactured at an acceptable quality level is to determine whether the viscosity curve of the experimental chemistry matches that of a known product which can be easily fiberized. Viscosity-temperature profiles may be measured on a viscometer, capable of operating at elevated temperatures. In addition, an adequate viscosity profile may be inferred by routine experimentation, examining the quality of fiber (index, diameter, length) produced. The shape of the viscosity vs. temperature curve for a glass composition is representative of the ease with which a melt will fiberize and thus, of the quality of the resulting fiber (affecting, for example, the fiber's shot content, fiber diameter, and fiber length). Glasses generally have low viscosity at high temperatures. As temperature decreases, the viscosity increases. The value of the viscosity at a given temperature will vary as a function of the composition, as will the overall steepness of the viscosity vs. temperature curve. The present fiber melt composition possesses a viscosity profile of a readily manufacturable fiber.

Linear shrinkage of an inorganic fiber is a good measure of a fiber's dimensional stability at high temperatures or of its performance at a particular continuous service or use temperature. Fibers are tested for shrinkage by forming them into a mat and needle punching the mat together into a pad of approximately 4-10 pounds per cubic foot density and a thickness of about 1 inch. Such pads are cut into 3 inch×5 inch pieces and platinum pins are inserted into the face of the material. The separation distance of these pins is then carefully measured and recorded. The pad is then placed into a furnace, ramped to temperature and held at the temperature for a fixed period of time. After heating, the pin separation is again measured to determine the linear shrinkage that pad has experienced.

In one such test, the length and width of the fiber pads were carefully measured, and the pad was placed in a furnace and brought to a temperature of 1260° C. or 1400° C. for 24 or 168 hours. After cooling, the lateral dimensions were measured and the linear shrinkage was determined by comparing "before" and "after" measurements. If the fiber is available in blanket form, measurements may be made directly on the blanket without the need to form a pad.

Mechanical integrity is also an important property since the fiber must support its own weight in any application and must also be able to resist abrasion due to moving air or gas. Indications of fiber integrity and mechanical strength are provided by visual and tactile observations, as well as mechanical measurement of these properties of after-service temperature exposed fibers. The ability of the fiber to maintain its integrity after exposure to the use temperature may also be measured mechanically by testing for compression strength and compression recovery. These tests measure, respectively, how easily the pad may be deformed and the amount of resiliency (or compression recovery) the pad exhibits after a compression of 50%. Visual and tactile observations indicate that the present inorganic fiber remains intact and maintains its form after exposure to a use temperature of at least 1260° C. or 1400° C.

The low biopersistent inorganic fibers are made by standard glass and ceramic fiber manufacturing methods. Raw materials, such as silica and any suitable source of magnesia such as enstatite, forsterite, magnesia, magnesite, calcined magnesite, magnesium zirconate, periclase, steatite, or talc may be used. Any suitable lithium-bearing compound may be used as the source of lithium oxide. Lithium may be included in the fiber melt as $Li_2CO_3$. If zirconia is included in the fiber melt, any suitable source of zirconia, such as baddeleyite, magnesium zirconate, zircon or zirconia may be used. The materials are introduced into a suitable furnace where they are melted and blown using a fiberization nozzle, or spun, either in a batch or a continuous mode.

According to certain embodiments, the present inorganic fiber has an average diameter of 4 microns and greater.

The inorganic fibers containing intended synergistic amounts of a combination of lithium oxide and calcia are useful for thermal insulating applications at continuous service or operating temperatures of at least 1260° C., 1400° C. or greater. According to certain embodiments, the fibers containing lithium oxide and calcium oxide are useful for thermal insulating applications at continuous service or operating temperatures of at least 1400° C. and it has been found that the magnesium-silicate fibers containing the calcium oxide and lithium oxide additions do not melt until they are exposed to a temperature of 1500° C. or greater.

The inorganic fibers may be prepared by fiber blowing or fiber spinning techniques. A suitable fiber blowing technique includes the steps of mixing the starting raw materials containing magnesia, silica, lithium oxide, calcium oxide, a further viscosity modifier, and optional zirconia together to form a material mixture of ingredients, introducing the material mixture of ingredients into a suitable vessel or container, melting the material mixture of ingredients for discharge through a suitable nozzle, and blowing a high pressure gas onto the discharged flow of molten material mixture of ingredients to form the fibers.

A suitable fiber spinning technique includes the steps of mixing the starting raw materials together to form a material mixture of ingredients, introducing the material mixture of ingredients into a suitable vessel or container, melting the material mixture of ingredients for discharge through a suitable nozzle onto spinning wheels. The molten stream then cascades over the wheels, coating the wheels and being thrown off through centripetal forces, thereby forming fibers.

In some embodiments, the fiber is produced from a melt of raw materials by subjecting the molten stream to a jet of high pressure/high velocity air or by pouring the melt onto rapidly spinning wheels and spinning fiber centrifugally.

In addition to the calcium oxide-bearing and lithium oxide-bearing compounds, the viscosity of the material melt of ingredients may optionally be controlled by the presence of other viscosity modifiers, in an amount sufficient to provide the fiberization required for the desired applications. The viscosity modifiers may be present in the raw materials which supply the main components of the melt, or may, at least in part, be separately added. Desired particle size of the raw materials is determined by furnacing conditions, including furnace size (SEF), pour rate, melt temperature, residence time, and the like.

The fiber may be manufactured with existing fiberization technology and formed into multiple thermal insulation product forms, including but not limited to bulk fibers, fiber-containing blankets, boards, papers, felts, mats, blocks, modules, coatings, cements, moldable compositions, pumpable compositions, putties, ropes, braids, wicking, textiles (such as cloths, tapes, sleeving, string, yarns, etc. . . . ), vacuum cast shapes and composites. The fiber may be used in combination with conventional materials utilized in the production of fiber-containing blankets, vacuum cast shapes and composites, as a substitute for conventional refractory ceramic fibers. The fiber may be used alone or in combination with other materials, such as binders and the like, in the production of fiber-containing paper and felt.

The fiber may be easily melted by standard glass furnacing methods, fiberized by standard RCF fiberization equipment, and is not biopersistent in simulated body fluids.

The high temperature resistant inorganic fibers are readily manufacturable from a melt having an improved viscosity suitable for blowing or spinning fiber, are non-durable in physiological fluids, exhibit good mechanical strength up to the service temperature, exhibit excellent linear shrinkage up to 1400° C. and above and improved viscosity for fiberization.

EXAMPLES

The following examples are set forth to describe illustrative embodiments of the inorganic fibers in further detail and to illustrate the methods of preparing the inorganic fibers, preparing thermal insulating articles containing the fibers and using the fibers as thermal insulation. However, the examples should not be construed as limiting the fiber, the fiber containing articles, or the processes of making or using the fibers as thermal insulation in any manner.

Linear Shrinkage

A shrinkage pad was prepared by needling a fiber mat using a bank of felting needles. A 3 inch×5 inch test piece was cut from the pad and was used in the shrinkage testing. The length and width of the test pad was carefully measured. The test pad was then placed into a furnace and brought to a temperature of 1400° C. for 24 hours. After heating for 24 hours, the test pad was removed from the test furnace and cooled. After cooling, the length and width of the test pad were measured again. The linear shrinkage of the test pad was determined by comparing the "before" and "after" dimensional measurements.

A second shrinkage pad was prepared in a manner similar to that disclosed for the first shrinkage pad. However, the second shrinkage pad was placed in a furnace and brought to a temperature of 1260° C. for 24 hours. After heating for 24 hours, the test pad was removed from the test furnace and cooled. After cooling, the length and width of the test pad were measured again. The linear shrinkage of the test pad was determined by comparing the "before" and "after" dimensional measurements.

Compression Recovery

The ability of the inorganic fibers to retain mechanical strength after exposure to a use temperature was evaluated by a compression recovery test. Compression recovery is a measure of the mechanical performance of an inorganic fiber in response to the exposure of the fiber to a desired use temperature for a given period of time. Compression recovery is measured by firing test pads manufactured from the inorganic fiber material to the test temperature for the selected period of time. The fired test pads are thereafter compressed to half of their original thickness and allowed to rebound. The amount of rebound is measured as percent recovery of the compressed thickness of the pad. Compression recovery was measured after exposure to use temperatures of 1260° C. for 24 hours and 168 hours, and 1400° C. for 24 hours and 168 hours.

Fiber Dissolution

The inorganic fiber is non-durable or non-biopersistent in physiological fluids. By "non-durable" or "non-biopersistent" in physiological fluids it is meant that the inorganic fiber at least partially dissolves or decomposes in such fluids, such as simulated lung fluid, during in vitro tests described below.

The biopersistence test measures the rate at which mass is lost from the fiber (ng/cm$^2$-hr) under conditions which simulate the temperature and chemical conditions found in the human lung. In particular, the fibers exhibit low biopersistence in Simulated Lung Fluid at a pH of about 7.4.

To measure the dissolution rate of fibers in simulated lung fluid, approximately 0.1 g of fiber is placed into a 50 ml centrifuge tube containing simulated lung fluid which has been warmed to 37° C. This is then placed into a shaking incubator for 6 hours and agitated at 100 cycles per minute. At the conclusion of the test, the tube is centrifuged and the solution is poured into a 60 ml syringe. The solution is then forced through a 0.45 μm filter to remove any particulate and tested for glass constituents using Inductively Coupled Plasma Spectroscopy analysis. This test may be conducted using either a near-neutral pH solution or an acidic solution. Although no specific dissolution rate standards exist, fibers with dissolution values in excess of 100 ng/cm$^2$-hr are considered indicative of a non-biopersistent fiber.

Table I shows fiber melt chemistries for various comparative and inventive fiber samples.

TABLE I

| Example | SiO$_2$ wt % | MgO wt % | Al$_2$O$_3$ wt % | CaO wt % | Fe$_2$O$_3$ wt % | Li$_2$O wt % |
|---|---|---|---|---|---|---|
| *C1 | 56.3 | 0 | 43.7 | 0 | 0 | 0 |
| **C2 | 78.5 | 18.8 | 1.8 | 0.4 | 0.23 | 0 |
| 3 | 80.0 | 17.5 | 1.2 | 1.1 | 0.10 | 0.09 |
| 4 | 79.8 | 15.6 | 1.2 | 3.2 | 0.09 | 0.09 |
| 5 | 80.7 | 15.2 | 1.2 | 2.7 | 0.10 | 0 |
| 6 | 80.3 | 12.4 | 1.2 | 6.0 | 0.08 | 0.09 |
| 7 | 80.0 | 12.5 | 1.3 | 6.0 | 0.08 | 0.34 |
| 8 | 79.5 | 14.1 | 0.4 | 6.0 | 0.07 | 0.34 |
| 9 | 79.7 | 14.1 | 0.4 | 5.8 | 0.08 | 0 |

*Blanket commercially available from Unifrax I LLC (Tonawanda, NY, USA) under the designation FIBERFRAX DURABLANKETS.
**Blanket commercially available from Unifrax I LLC (Tonawanda, NY, USA) under the designation ISOFRAX Blanket.
C = Comparative Table II shows the median fiber diameter for the fibers of Table I, and the thickness (inches) and density (pcf) of a blanket prepared from the fibers.

TABLE II

| Example | Blanket Thickness Inches | Blanket Density pcf | Fiber diameter Mean micron |
|---|---|---|---|
| C1 | 1.0 | 7.2 | 4.6 |
| C2 | 1.2 | 6.8 | 7.6 |
| 3 | 1.2 | 6.3 | 4.9 |
| 4 | 1.1 | 6.9 | 4.0 |
| 5 | 1.0 | 7.4 | 4.1 |
| 6 | 1.2 | 6.5 | 4.9 |
| 7 | 1.1 | 6.7 | 5.1 |
| 8 | 1.2 | 5.6 | 4.6 |
| 9 | 1.2 | 5.8 | 4.5 |

Table III shows the results for shrinkage for the fibers after exposure to 1260° C. and 1400° C. for 24 hours.

TABLE III

| Example | Shrinkage 1260° C./24 hours % | Shrinkage 1400° C./24 hours % |
|---|---|---|
| C1 | 4.6 | 10.1 |
| C2 | 7.8 | 10.0 |
| 3 | 2.8 | 2.9 |
| 4 | 2.7 | 4.2 |
| 5 | 4.5 | 6.2 |
| 6 | 1.9 | 9.3 |
| 7 | 2.1 | 11.8 |
| 8 | 1.5 | 15.8 |
| 9 | 4.1 | 13.2 |

Table III shows that a magnesium-silicate inorganic fiber composition including a synergistic combination of calcium oxide and lithium oxide as a component of the fiberization product results in lower linear shrinkage at both 1260° C. and 1400° C. as compared to magnesium-silicate inorganic fiber without the intended calcium oxide and lithium oxide additions.

Table IV shows the results compression recovery after exposure to 1260° C. and 1400° C. for 24 hours, and solubility for the fibers of Table I.

TABLE IV

| Example | Comp Rec 1260° C. 24 hours % | Comp Rec 1400° C. 24 hours % | Solubility (k) ng/cm² hr |
|---|---|---|---|
| C1 | 63 | 49 | 25 |
| C2 | 32 | 8 | 400 |
| 3 | 58 | 20 | * |
| 4 | 61 | 3 | * |
| 5 | 53 | 15 | 804 |
| 6 | 64 | 15 | 515 |
| 7 | 43 | 16 | * |
| 8 | 35 | 9 | 1162 |
| 9 | 50 | 9 | 1490 |

* The solubility of these fiber compositions was not tested.

Table IV shows that a magnesium-silicate inorganic fiber composition including an intended synergistic combination of calcium oxide and lithium oxide as a component of the fiberization product results in an improvement in compression recovery at both 1260° C. and 1400° C., as compared to magnesium-silicate inorganic fiber without the intended calcium oxide and lithium oxide additions. The magnesium-silicate inorganic fiber composition including a synergistic combination of calcium oxide and lithium oxide as a component of the fiberization product exhibits an average compression recovery after exposure to 1260° C. for 24 hours of at least 50%. The magnesium-silicate inorganic fiber composition including a synergistic combination of calcium oxide and lithium oxide as a component of the fiberization product exhibits an average compression recovery after exposure to 1400° C. for 24 hours of at least 10%.

Table V shows the results compressive strength after exposure to 1260° C. and 1400° C. for 24 hours for the fibers of Table I.

TABLE V

| Sample | Compressive Strength 1260° C./24 hours (psi) | Compressive Strength 1400° C./24 hours (psi) |
|---|---|---|
| C1 | 8 | 17 |
| C2 | 6 | 3 |
| 3 | 4 | 1 |
| 4 | 5 | 1 |
| 5 | 11 | 2 |
| 6 | 3 | 2 |
| 7 | 3 | 3 |
| 8 | 1 | 2 |
| 9 | 5 | 2 |

While the inorganic fiber, thermal insulation, methods of preparing the inorganic fiber, and method of insulating articles using the thermal insulation have been described in connection with various embodiments, it is to be understood that other similar embodiments may be used or modifications and additions may be made to the described embodiments for performing the same function. Furthermore, the various illustrative embodiments may be combined to produce the desired results. Therefore, the inorganic fiber, thermal insulation, methods of preparing the inorganic fiber, and method of insulating articles using the thermal insulation should not be limited to any single embodiment, but rather construed in breadth and scope in accordance with the recitation of the appended claims. It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

The invention claimed is:

1. An inorganic fiber comprising a fiberization product of silica, about 5 weight percent or greater magnesia, about 1 weight percent or greater calcia, greater than 0 to about 5 weight percent alumina and at least one alkali metal oxide, wherein said inorganic fiber exhibits a shrinkage of 5% or less after exposure to a temperature of 1400° C. for 24 hours.

2. The inorganic fiber of claim 1, wherein said inorganic fiber exhibits a shrinkage of 4% or less after exposure to a temperature of 1260° C. for 24 hours.

3. The inorganic fiber of claim 1, wherein said inorganic fiber comprises the fiberization product of about 65 to about 86 weight percent silica, about 5 to about 33 weight percent magnesia, about 1 weight percent or greater calcia, and at least one alkali metal oxide.

4. The inorganic fiber of claim 1, wherein said inorganic fiber comprises the fiberization product of about 70 to about 85 weight percent silica, about 10 to about 25 weight percent magnesia, about 1 weight percent or greater calcia, and greater than 0 to about 2 weight percent at least one alkali metal oxide.

5. The inorganic fiber of claim 1, wherein said inorganic fiber comprises the fiberization product of about 70 to about 85 weight percent silica, about 10 to about 25 weight percent magnesia, about 1 weight percent or greater calcia, and greater than 0 to about 1 weight percent at least one alkali metal oxide.

6. The inorganic fiber of claim 1, wherein said inorganic fiber comprises the fiberization product of about 70 to about 85 weight percent silica, about 10 to about 25 weight percent magnesia, about 1 weight percent or greater calcia, greater than 0 to about 5 weight percent at least one alkali metal oxide, and greater than 0 to about 3 weight percent alumina.

7. The inorganic fiber of claim 1, wherein said inorganic fiber comprises 1 weight percent or less iron oxide, measured as $Fe_2O_3$.

8. An inorganic fiber containing article comprising at least one of bulk fiber, blankets, blocks, boards, caulking compositions, cement compositions, coatings, felts, mats, moldable compositions, modules, papers, pumpable compositions, putty compositions, sheets, tamping mixtures, vacuum cast shapes, vacuum cast forms, or woven textiles, braids, cloths, fabrics, ropes, tapes, sleeving, wicking, said fiber containing article comprising a plurality of inorganic fibers comprising the fiberization product of claim 1.

9. The inorganic fiber of claim 1, wherein said inorganic fiber comprises the fiberization product of about 65 to about 86 weight percent silica, about 5 to about 33 weight percent magnesia, about 1 weight percent or greater calcia, and greater than 0 to about 5 weight percent at least one alkali metal oxide.

10. The inorganic fiber of claim 9, wherein said at least one alkali metal oxide comprises lithia.

11. The inorganic fiber of claim 10, wherein said inorganic fiber comprises the fiberization product of about 65 to about 86 weight percent silica, about 5 to about 33 weight percent magnesia, about 1 weight percent or greater calcia, and greater than 0 to about 2 weight percent at least one alkali metal oxide.

12. The inorganic fiber of claim 10, wherein said inorganic fiber comprises the fiberization product of about 65 to about 86 weight percent silica, about 5 to about 33 weight percent magnesia, about 1 weight percent or greater calcia, and greater than 0 to about 1 weight percent at least one alkali metal oxide.

13. The inorganic fiber of claim 10, wherein said inorganic fiber comprises the fiberization product of about 65 to about 86 weight percent silica, about 5 to about 33 weight percent magnesia, about 1 weight percent or greater calcia, greater than 0 to about 5 weight percent at least one alkali metal oxide, and greater than 0 to about 4 weight percent alumina.

14. The inorganic fiber of claim 1, wherein said inorganic fiber comprises the fiberization product of about 75 to about 82 weight percent silica, about 12 to about 23 weight percent magnesia, about 1 to about 3 weight percent calcia, and greater than 0 to about 2 weight percent at least one alkali metal oxide.

15. The inorganic fiber of claim 14, wherein said at least one alkali metal oxide comprises lithia.

16. The inorganic fiber of claim 15, wherein said inorganic fiber comprises the fiberization product of about 75 to about 82 weight percent silica, about 12 to about 23 weight percent magnesia, about 1 to about 3 weight percent calcia, and greater than 0 to about 1 weight percent at least one alkali metal oxide.

17. The inorganic fiber of claim 15, wherein said inorganic fiber comprises the fiberization product of about 75 to about 82 weight percent silica, about 12 to about 23 weight percent magnesia, about 1 to about 3 weight percent calcia, and greater than 0 to about 0.75 weight percent at least one alkali metal oxide.

18. The inorganic fiber of claim 15, wherein said inorganic fiber comprises the fiberization product of about 75 to about 82 weight percent silica, about 12 to about 23 weight percent magnesia, about 1 to about 3 weight percent calcia, and greater than 0 to about 0.5 weight percent at least one alkali metal oxide.

19. The inorganic fiber of claim 15, wherein said inorganic fiber comprises the fiberization product of about 75 to about 82 weight percent silica, about 12 to about 23 weight percent magnesia, about 1 to about 3 weight percent calcia, greater than 0 to about 1 weight percent at least one alkali metal oxide, and greater than 0 to about 3 weight percent alumina.

20. The inorganic fiber of claim 1, wherein said inorganic fiber comprises the fiberization product of about 75 to about 82 weight percent silica, about 5 to about 20 weight percent magnesia, greater than 3 weight percent calcia, and greater than 0 to about 2 weight percent at least one alkali metal oxide.

21. The inorganic fiber of claim 20, wherein said at least one alkali metal oxide comprises lithia.

22. The inorganic fiber of claim 21, wherein said inorganic fiber comprises the fiberization product of about 75 to about 82 weight percent silica, about 5 to about 20 weight percent magnesia, greater than 3 weight percent calcia, and greater than 0 to about 1 weight percent at least one alkali metal oxide.

23. The inorganic fiber of claim 21, wherein said inorganic fiber comprises the fiberization product of about 75 to about 82 weight percent silica, about 5 to about 20 weight percent magnesia, greater than 3 weight percent calcia, and greater than 0 to about 0.75 weight percent at least one alkali metal oxide.

24. The inorganic fiber of claim 21, wherein said inorganic fiber comprises the fiberization product of about 75 to about 82 weight percent silica, about 5 to about 20 weight percent magnesia, greater than 3 weight percent calcia, and greater than 0 to about 0.5 weight percent at least one alkali metal oxide.

25. The inorganic fiber of claim 21, wherein said inorganic fiber comprises the fiberization product of about 75 to about 82 weight percent silica, about 5 to about 20 weight percent magnesia, greater than 3 weight percent calcia, greater than 0 to about 1 weight percent at least one alkali metal oxide, and greater than 0 to about 3 weight percent alumina.

26. The inorganic fiber of claim 21, wherein said inorganic fiber comprises the fiberization product of about 75 to about 82 weight percent silica, about 5 to about 20 weight percent magnesia, about 3 to about 6 weight percent calcia, and greater than 0 to about 2 weight percent at least one alkali metal oxide.

* * * * *